United States Patent [19]
Fujita et al.

[11] Patent Number: 5,445,577
[45] Date of Patent: Aug. 29, 1995

[54] METHOD AND APPARATUS FOR SPEED CHANGE CONTROL OF AN AUTOMATIC TRANSMISSION

[75] Inventors: Kenjiro Fujita, Kusatsu; Katsutoshi Usuki, Kyoto; Katsuhiro Hatta, Uji, all of Japan

[73] Assignee: Mitsubishi Jidosha Kogyo Kabushiki Kaisha, Tokyo, Japan

[21] Appl. No.: 45,714

[22] Filed: Apr. 14, 1993

[30] Foreign Application Priority Data

Apr. 15, 1992 [JP] Japan .................. 4-095510

[51] Int. Cl.⁶ .............................................. F16H 59/48
[52] U.S. Cl. .................. 477/120; 364/424.1
[58] Field of Search .............. 74/335, 336 R; 364/424.1; 477/143, 155, 154, 120

[56] References Cited

U.S. PATENT DOCUMENTS

| | | | |
|---|---|---|---|
| 4,665,772 | 5/1987 | Greene | 74/335 |
| 4,843,902 | 7/1989 | Patton et al. | 74/335 |
| 4,913,004 | 4/1990 | Panoushek et al. | |
| 4,947,329 | 8/1990 | Benford et al. | 477/120 |
| 4,984,483 | 1/1991 | Hiramatsu et al. | |
| 5,046,176 | 9/1991 | Lin | |
| 5,046,383 | 9/1991 | Butts et al. | 477/120 |
| 5,058,014 | 10/1991 | Saitou et al. | |
| 5,197,006 | 3/1993 | Saitou et al. | 477/120 |
| 5,245,893 | 9/1993 | Koenig et al. | 477/120 |
| 5,282,401 | 1/1994 | Hebbale et al. | 477/120 |

FOREIGN PATENT DOCUMENTS

| | | | |
|---|---|---|---|
| 0354493 | 2/1990 | European Pat. Off. | |
| 2160929 | 7/1987 | Japan | 477/120 |
| 3177655 | 1/1991 | Japan | |

Primary Examiner—Thomas E. Denion

[57] ABSTRACT

During downshift operation of an automotive automatic transmission in which a lower-speed clutch for establishing a lower-speed gear is engaged while a higher-speed clutch, which has established a higher-speed gear, is disengaged, to increase the turbine rotational speed Nt toward a synchronous rotation speed Ntj associated with the lower-speed gear, speed change control is carried out according to the same control method regardless of whether the engine is in a power-on or power-off state. A target change rate (Nir)' of turbine rotational speed associated with the higher-speed clutch and a target change rate (Nia)' of turbine rotational speed associated with the lower-speed clutch are set, and a change rate (Nt)' of the turbine rotational speed is detected. The transmission torque through the higher-speed clutch is controlled in a feedback manner such that the detected change rate (Nt)' coincides with the change rate (Nir)', and also the transmission torque through the lower-speed clutch is feedback-controlled such that the change rate (Nt)' coincides with the change rate (Nia)', thereby carrying out downshift.

28 Claims, 22 Drawing Sheets

METHOD AND APPARATUS FOR SPEED CHANGE CONTROL OF AN AUTOMATIC TRANSMISSION

BACKGROUND OF THE INVENTION

The present invention relates to a method and an apparatus for speed change control of an automatic transmission for motor vehicles.

Automatic transmissions installed in motor vehicles comprise a large number of frictional engaging elements, such as hydraulic multiple disc clutches, hydraulic brakes and the like. Among these clutches and brakes, those to be operated are subjected to switching control by a controller, to carry out a shift of the automatic transmission.

The hydraulic multiple disc clutches and the hydraulic brakes each include a large number of friction plates. In such clutches and brakes, a predetermined clearance is provided between adjacent friction plates, taking machining error and assembling error into consideration, to prevent drag torque from occurring between the friction plates when the clutch or brake has been released.

Accordingly, when engaging the clutch or the like which is completely disengaged, the piston must be moved so at to make the aforementioned clearance zero, or a so-called dead space (clearance) elimination must be carried out, after the application of hydraulic pressure is started. Thus, a predetermined dead space elimination time (hydraulic pressure supply time) is required before the friction plates actually become engaged with each other.

On the other hand, to fully disengage the clutch or the like, after the supply of hydraulic pressure has been stopped, the friction plates must be separated from each other to make the aforementioned clearance therebetween, while the operating oil in the clutch is discharged by the force of a return spring or the like. Thus, a predetermined hydraulic pressure release time is required before the transmission torque is reduced to zero.

In the automatic transmission described above, when downshift from the second to the first speed, for example, is effected, the controller disengages a second-speed clutch for establishing the second speed and engages a first-speed clutch for establishing the first speed, in accordance with a predetermined program. This increases the rotational speed Nt of a transmission input shaft such that a change rate $(Nt)'$ thereof becomes equal to a target change rate $(Ni)'$. Thereby, changeover of the clutch connection can be carried out. The controller then estimates the time at which the rotational speed Nt of the input shaft becomes synchronized with a first-speed synchronous rotation speed, and starts driving a solenoid valve for controlling the first-speed clutch at a 100% duty factor at the point of time preceding the estimated time by a predetermined period. Thus full hydraulic pressure is applied to the first-speed clutch. As a result, engagement of the first-clutch rapidly progresses and is completed at the estimated time. Accordingly, the engine torque transmission path is switched from the second-speed clutch to the first-speed clutch, and the automatic transmission downshifts from the second speed to the first speed.

When the accelerator pedal at the driver's seat is depressed during downshift and thus the engine is in a power-on state, the rotational speed Nt of the input shaft is going to rise. On the other hand, when the accelerator pedal is released during downshift and the engine is in a power-off state, the rotational speed Nt of the input shaft does not increase.

To cope with such difference, the controller prestores therein a control program for carrying out downshift during power-on state and a control program for carrying out downshift during power-off state. When a downshift is to be effected, the controller first detects the engine drive state, and selects one of the control programs in accordance with the result of the detection.

More specifically, when it is determined that the engine is driven in a power-on state, the controller executes the power-on program. In accordance with this power on program the second-speed clutch is gradually disengaged to suppress a sudden increase of the rotational speed Nt of the input shaft, and the input shaft speed Nt is increased such that the change rate $(Nt)'$ thereof coincides with the target change rate $(Ni)'$. The controller then actuates the first-speed clutch at predetermined timing such that the first-speed clutch becomes completely engaged when the input shaft speed Nt reaches the first-speed synchronous rotation speed, thereby carrying out the downshift.

On the other hand, when it is determined that the engine is driven in a power-off state, the controller executes the power-off program. In accordance with the power off program the second-speed clutch is immediately disengaged, and then the first-speed clutch is gradually engaged to increase the rotational speed Nt of the input shaft such that the change rate $(Nt)'$ thereof becomes equal to the target change rate $(Ni)'$. After the rotational speed Nt reaches the first-speed synchronous rotation speed, the controller completely engages the first-speed clutch, thereby effecting the downshift.

If, during a downshift, the driver depresses the accelerator pedal and the engine drive state changes from a power-off state to a power-on state or vice versa, or if the controller makes an erroneous determination when the engine is operating in a boundary region between the power-on and power-off states, the controller executes an improper program that does not match the engine drive state, causing the following disadvantages.

Namely, if the controller determines that the engine is in a power-off state and executes the power-off program although the engine is actually in a power-on state, the input shaft, of which the rotational speed is rapidly increasing, is suddenly coupled to the first-speed clutch, causing a large shift shock. If, on the other hand, the controller determines that the engine is in a power-on state and executes the power-on program although the engine is actually in a power-off state, the rotational speed of the input shaft does not increase, thus causing problems such that the progress of shift operation is hindered.

Further, as mentioned above, an estimate is made of the time at which the rotational speed Nt of the input shaft becomes synchronized with the first-speed synchronous rotation speed, and the first-speed clutch is quickly engaged based upon the estimated time. Therefore, if the accelerator pedal is operated during execution of a downshift and the estimated time becomes improper, for example, the input shaft, which is not synchronized, is abruptly coupled to the output shaft, causing problems such as a large shift shock.

Furthermore, during the changeover of clutch connection, if engagement of the first-speed clutch is started when the second-speed clutch is not yet disengaged, interlocking (both the first-speed clutch and the second-speed clutch are engaged) occurs, possibly locking the transmission. Conversely, if the first-speed clutch is engaged too late, failure of clutch connection (neither the first-speed clutch nor the second-speed clutch is engaged) occurs, causing an undesired rise or drop of the engine rotation speed, depending upon the operating states, and prolonging the shift time.

OBJECTS AND SUMMARY OF THE INVENTION

The present invention was created to solve the above-described problems, and an object thereof is to provide a speed change control method for an automotive automatic transmission which permits a downshift to be effected properly, regardless of whether the engine is in a power-on or power-off state.

Another object of the invention intended to solve the aforesaid problems is to provide a method and an apparatus for speed change control of an automotive automatic transmission which can reduce a shift shock that occurs at the end of shift operation.

Still another object of the invention intended to solve the aforesaid problems is to provide a method and an apparatus for speed change control of an automotive automatic transmission which permits a smooth changeover of connection between frictional engaging elements at the start of shift operation, thereby reducing a shift shock.

In order to achieve the above-mentioned objects, according to one aspect of the present invention, there is provided a speed change apparatus for an automotive automatic transmission including a first frictional engaging element for establishing a first gear stage, a second frictional engaging element for establishing a second gear stage, a first electromagnetic valve for controlling an operating oil pressure supplied to the first frictional engaging element, and a second electromagnetic valve for controlling an operating oil pressure supplied to the second frictional engaging element. The speed change control apparatus operates to control the first and second electromagnetic valves such that the first frictional engaging element, which has been engaged, is released, and the second frictional engaging element, which has been released, is engaged, to carry out a shift from the first gear stage to the second gear stage.

This speed change control apparatus comprises operating state detecting means for detecting an operating state of the automatic transmission, and feedback control means. The feedback control means includes: feedback target value setting means for setting first and second feedback target values; first feedback control means for feedback-controlling the first electromagnetic valve such that an operation state quantity detected by the operating state detecting means converges to the first feedback target value; and second feedback control means for feedback-controlling the second electromagnetic valve such that the operation state quantity detected by the operating state detecting means converges to the second feedback target value. The first feedback target value is set to be greater than or equal to the second feedback target value. The speed change apparatus operates such that the shift from the first gear stage to the second gear stage is carried out by feedback-controlling both the first and second electromagnetic valves.

Preferably, the speed change control apparatus further includes means for interrupting the control operation of the first feedback control means and making the transmission torque through the first frictional engaging element substantially zero when the operation state quantity becomes smaller than or equal to the second feedback target value. Preferably, the operation state quantity is represented by a rate of change in rotational speed of an input shaft of the automatic transmission.

According to another aspect of the present invention, the speed change control apparatus comprises: first time measuring means for measuring a time period from the start of discharge of operating oil pressure from the first frictional engaging element until a transmission torque through the first frictional engaging element becomes substantially zero; second time measuring means for measuring a time period from the start of supply of operating oil pressure to the second frictional engaging element until a time point immediately before a time point at which torque is substantially transmitted through the second frictional engaging element; and control means for controlling the start of discharge of operating oil pressure from the first frictional engaging element and the start of supply of operating oil pressure to the second frictional engaging element, based on values detected by the first and second time measuring means, such that the time point at which the transmission torque through the first frictional engaging element becomes substantially zero coincides with the time point immediately before the time point at which torque is substantially transmitted through the second frictional engaging element.

Preferably, the automatic transmission includes an oil pump for supplying operating oil pressure to the first and second frictional engaging elements, and the speed change control apparatus includes correction means for correcting the time periods measured by the first and second time measuring means, based upon the temperature of the operating oil and/or the rotational speed of the oil pump.

According to a further aspect of the present invention, the speed change control apparatus comprises: synchronized point detecting means for detecting a time point, as a synchronized point, at which the rotational speed of an input shaft of the automatic transmission reaches a rotational speed which is regarded as corresponding to the second gear stage; first pressure increasing means for increasing the oil pressure supplied to the second frictional engaging element to a predetermined pressure when the synchronized point is detected; and second pressure increasing means for further increasing the oil pressure supplied to the second frictional engaging element beyond the predetermined pressure.

Preferably, the speed change control apparatus includes at least one of predetermined-time holding means, predetermined-time continuance means, and maximum oil pressure supply means. The predetermined-time holding means operates to maintain the predetermined pressure for a predetermined time period. The predetermined-time continuance means operates to causes the second pressure increasing means to gradually carry out the increase of operating oil pressure and to continue the gradual pressure increase for a predetermined time period. The maximum oil pressure supply means operates to supply a maximum oil pressure to the second frictional engaging element after the operating oil pressure is increased by the pressure increasing means. More preferably, the speed change control apparatus further includes predetermined-pressure changing means for changing the predetermined pressure in accordance with an operating state of a vehicle. The operating state is represented by an engine load of the vehicle or by a torque input to the input shaft.

According to a still further aspect of the present invention, there is provided a speed change control method for an automotive automatic transmission in which a first frictional engaging element, which has been engaged, is released, and a second frictional engaging element, which has been released, is engaged, to carry out a shift from a first gear stage to a second gear stage. This speed change control method comprising the steps of: setting a first feedback target value; setting a second feedback target value smaller than the first feedback target value; detecting an operating state quantity indicative of an operating state of the automatic transmission; and feedback-controlling a transmission torque through the first electromagnetic valve such that the detected operation state quantity converges to the first feedback target value, and feedback-controlling a transmission torque through the second electromagnetic valve such that the detected operation state quantity converges to the second feedback target value.

Preferably, the feedback control associated with the first frictional engaging element is interrupted, and the transmission torque through the first frictional engaging element is rendered substantially zero when the operation state quantity becomes smaller than or equal to the second feedback target value. The operation state quantity is represented by a rate of change in rotational speed of an input shaft of the automatic transmission.

According to another aspect of the present invention, a speed change control method comprises the steps of: storing beforehand a time period from the start of discharge of operating oil pressure from the first frictional engaging element until a transmission torque through the first frictional engaging element becomes substantially zero, and a time period from the start of supply of operating oil pressure to the second frictional engaging element until a time point immediately before a time point at which torque is substantially transmitted through the second frictional engaging element; measuring a time period elapsed from the start of the shift; and controlling the start of discharge of operating oil pressure from the first frictional engaging element and the start of supply of operating oil pressure to the second frictional engaging element, based on the measured elapsed time and both the stored time periods, such that the time point at which the transmission torque through the first frictional engaging element becomes substantially zero coincides with the time point immediately before the time point at which torque is substantially transmitted through the second frictional engaging element.

Preferably, both the stored time periods are corrected, based upon the temperature of the operating oil and/or the rotational speed of an oil pump of the automatic transmission.

According to a further aspect of the present invention, the speed change control method comprises: a step of detecting a time point, as a synchronized point, at which the rotational speed of an input shaft of the automatic transmission reaches a rotational speed which is regarded as corresponding to the second gear stage; a first pressure increasing step of increasing the oil pressure supplied to the second frictional engaging element to a predetermined pressure when the synchronized point is detected; and a second pressure increasing step of further increasing the oil pressure supplied to the second frictional engaging element beyond the predetermined pressure.

Preferably, the first pressure increasing step includes a step of maintaining the predetermined pressure for a predetermined time, and the second pressure increasing step includes a step of gradually increasing operating oil pressure for a predetermined time period. The speed change control method further includes a step of supplying a maximum oil pressure the second frictional engaging element after the operating oil pressure is increased, and/or a step of changing the predetermined pressure in accordance with an operating state of a vehicle which is represented by an engine load of the vehicle or by a torque input to the input shaft.

As described above, in the speed change control method and apparatus according to the present invention, when a downshift is to be carried out, first and second feedback target values are set, a speed change state quantity is detected, the transmission torque through the first frictional engaging element is subjected to feedback control such that the detected speed change state quantity coincides with the first feedback target value, and the transmission torque through the second frictional engaging element is subjected to feedback control such that the speed change state quantity coincides with the second feedback target value. This thereby effect changeover of connection of the first and second frictional engaging elements, while increasing the rotational speed of the input shaft toward the lower-speed synchronous rotation speed. At this time, at least one of these frictional engaging elements is rendered operative. Thus, the present invention is advantageous in that downshift can be carried out according to the same speed change control method, regardless of the engine drive state, i.e., whether the engine is in a power-on or power-off state. Further, the present invention is advantageous in that it is possible to eliminate shift shock, prolonged shift time, etc. which are caused by erroneous determination of power-on or power-off state when the engine is driven in a boundary region between the power-on and power-off states. Furthermore, the present invention is advantageous in that, when downshift is effected, variation in torque (shift shock) of the output shaft of the automatic transmission can be suppressed.

Further, in the speed change control method and apparatus according to the present invention, when synchronization of the input shaft rotational speed with a transfer rotation speed associated with a gear to be established after gear-changing is detected, the operating oil pressure for the second frictional engaging element is set to a predetermined oil pressure to advance engagement of the second frictional engaging element to a predetermined state. Then, the operating oil pressure is gradually increased. Thus, the present invention has an effect of reducing shift shock that may occur at the end of a gear-changing operation.

Furthermore, in the speed change control method and apparatus according to the present invention, an oil pressure release time from the start of discharge of the operating oil pressure from the first frictional engaging element to the time the torque becomes substantially zero is obtained, and also an oil pressure supply time from the start of supply of the operating oil pressure to the second frictional engaging element to the time immediately before the time at which torque is substantially generated is obtained. When the hydraulic pressure release time of the first frictional engaging element is longer than the hydraulic pressure supply time of the second frictional engaging element, hydraulic pressure is supplied to the second frictional engaging element upon lapse of a predetermined time after the discharge of hydraulic pressure from the first engaging element is started. On the other hand, when the above hydraulic pressure release time is shorter than the hydraulic pressure supply time, hydraulic pressure is discharged from the first frictional engaging element upon lapse of a predetermined time after the supply of hydraulic pressure to the second frictional engaging element is started. Thus, the end of the pressure release time can be made coincident with the end of the pressure supply time. Accordingly, the present invention is advantageous in that connection-switching from the first frictional engaging element to the second frictional engaging element can be smoothly carried out, interlocking and undesired rise of the engine rotation during the gear-changing can be prevented, and the shift shock can be reduced.

These and other objects and advantages will become more readily apparent from an understanding of the preferred embodiment described below with reference to the following drawing figures.

BRIEF DESCRIPTION OF THE DRAWINGS

The invention will become more fully understood from the detailed description herein below with reference to the accompanying figures, given by way of illustration only and not intended to limit the present invention in which.

DETAILED DESCRIPTION OF THE INVENTION

One embodiment of the present invention will be now described in detail with reference to the accompanying drawings.

Figure 1:
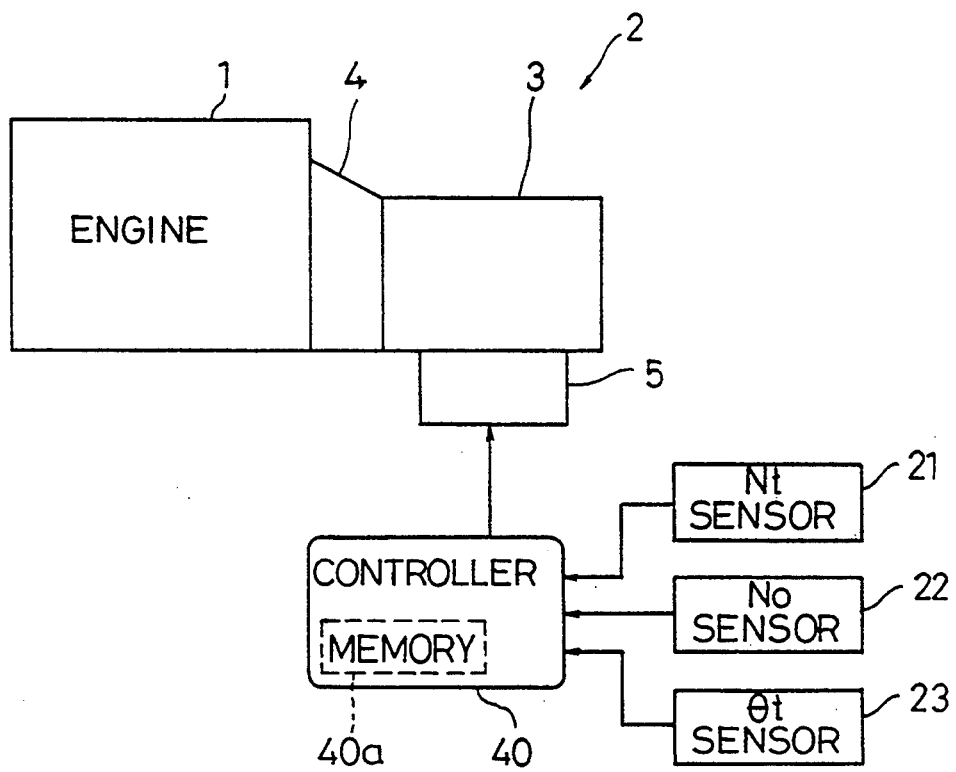
FIG. 1 is a schematic diagram of an automotive automatic transmission for carrying out a speed change control method according to the present invention.

FIG. 1 illustrates a schematic arrangement of an automotive automatic transmission to which a speed change control method according to the invention is applied. In the figure, reference numeral 1 denotes an internal combustion engine, the output of which is transmitted to drive wheels (not shown) through an automatic transmission 2.

The automatic transmission 2 comprises a torque converter 4, a gear transmission 3, a hydraulic circuit 5, a controller 40, and other elements. The gear transmission 3 includes a gear train of, e.g., a four-forward and one-reverse type, and a large number of speed-change frictional engaging elements for effecting a speed change through the selection of a gear ratio of the gear train. The speed change frictional engaging elements include, e.g., hydraulic clutches and hydraulic brakes.

Figure 2:
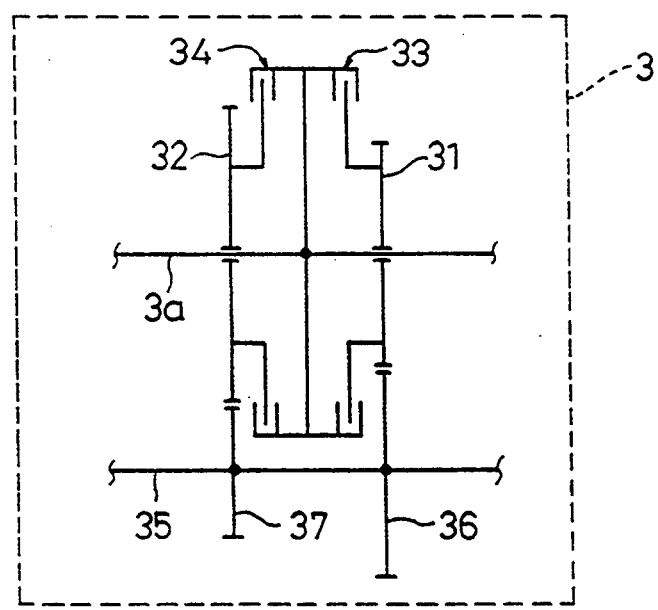
FIG. 2 is a schematic diagram showing part of a gear train in a gear transmission shown in FIG. 1.

FIG. 2 illustrates part of the gear transmission 3. First and second driving gear wheels 31 and 32 are rotatably disposed around an input shaft 3a, and hydraulic clutches 33 and 34, as the speed change frictional engaging elements, are secured between the first driving gear wheel 31 and the input shaft 3a and between the second driving gear wheel 32 and the input shaft 3a, respectively. The driving gear wheels 31 and 32, when engaged with the clutches 33 and 34, respectively, rotate together with the input shaft 3a.

An intermediate transmission shaft 35 extends parallel with the input shaft 3a and is coupled to a drive axle via a final reduction gear, not shown. First and second driven gear wheels 36 and 37 are secured to the intermediate transmission shaft 35 and are in mesh with the driving gear wheels 31 and 32, respectively.

Thus, when the input shaft 3a is coupled to the first driving gear wheel 31 through the clutch 33, rotation of the input shaft 3a is transmitted to the intermediate transmission shaft 35 through the clutch 33, the first driving gear wheel 31, and the first driven gear wheel 36, thereby establishing a first speed, for example. When the input shaft 3a is coupled to the second driving gear wheel 32 through the clutch 34, rotation of the input shaft 3a is transmitted to the intermediate transmission shaft 35 via the clutch 34, the second driving gear wheel 32, and the second driven gear wheel 37, thereby establishing, e.g., a second speed. Thus, the clutches 33 and 34 are used to establish the first speed and the second speed, respectively, and accordingly, are hereinafter referred to as the first-speed clutch and the second-speed clutch, respectively.

When the first-speed clutch 33, which has been engaged, is disengaged while the second-speed clutch 34 is engaged, the automatic transmission 2 upshifts from the first speed to the second speed. Conversely, when the second-speed clutch 34, which has been engaged, is disengaged while the first-speed clutch 33 is engaged, the automatic transmission 2 downshifts from the second speed to the first speed.

Figure 3:
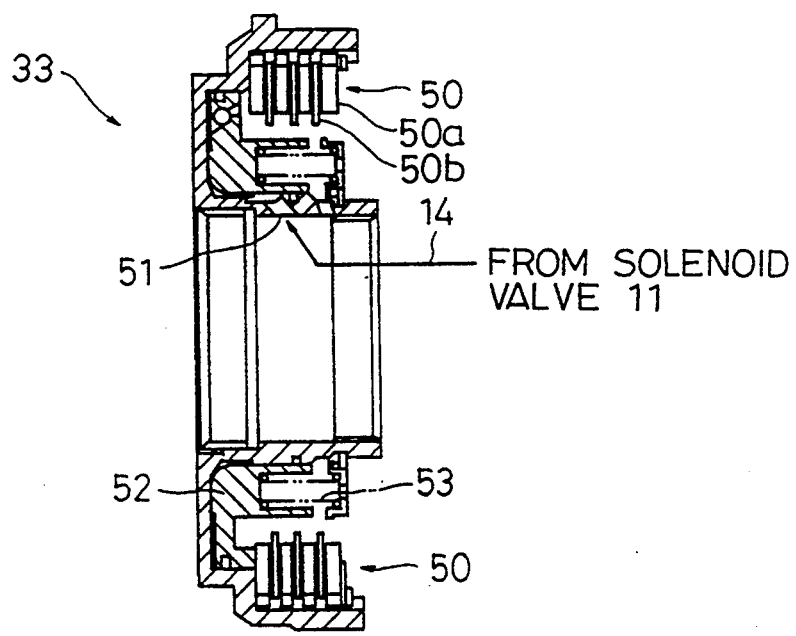
FIG. 3 is a sectional view of a clutch shown in FIG. 2.

The clutches 33 and 34 each comprise a hydraulic multiple disc clutch, and a section of the first-speed clutch 33 is illustrated in FIG. 3. As illustrated, the clutch 33 comprises frictional engaging plates 50, a clutch piston 52, a return spring 53 urging the clutch piston 52 in such a direction as to separate the piston 52 from the frictional engaging plates 50, a clutch retainer 54 containing these elements, etc.

The frictional engaging plates 50 are composed of a plurality of clutch plates 50a attached to the clutch retainer 54, and a plurality of clutch discs 50b each disposed between corresponding ones of the clutch plates 50a. The clutch discs 50b are coupled to the driving gear wheel 31, and the clutch retainer 54 is coupled to the input shaft 3a.

When operating oil is introduced from an oil passage 14, mentioned later, into a cylinder defined between the clutch piston 52 and the clutch retainer 54 through a port 51, the clutch piston 52 moves to the right, as viewed in the figure, and causes the clutch plates 50a and the clutch discs 50b frictionally engage with one another. When the operating oil is discharged from the cylinder through the oil passage 14, the clutch piston 52 moves to the left, as viewed in the figure, due to the action of the return spring 53, and the engagement between the clutch plates 50a and the clutch discs 50b is released.

In multiple disc clutches of this type, a predetermined clearance is usually provided between the clutch piston and the frictional engaging plates so that the clutch piston may not contact the frictional engaging plates when the clutch is disengaged, to thereby prevent a so-called drag torque. Therefore, when controlling engagement of the first-speed clutch 33, the clutch piston 52 must first be moved over a distance (ineffective stroke) corresponding to the clearance and then be held at a position immediately before a position where the clutch piston 52 contacts the clutch plates 50a. Namely, a so-called dead space (clearance) elimination must be carried out, and this dead space elimination requires a certain time Tf.

In the case of disengaging the engaged first-speed clutch 33, even if the operating oil is discharged and the clutch piston 52 is removed, the clutch plates 50a and the clutch discs 50b do not instantly separate from one another and drag torque is produced therebetween for a while. Accordingly, before the first-speed clutch 33 is completely disengaged, a hydraulic pressure release time T0 exists from the start of discharge of the operating oil to the time at which drag torque is no longer produced.

The second-speed clutch 34 has the same structure as the first-speed clutch 33, and thus also requires a predetermined dead space elimination time Tf' and a hydraulic pressure release time T0' during engagement and disengagement thereof, respectively.

The hydraulic circuit 5 includes duty-controlled solenoid valves (hereinafter merely referred to as "solenoid valves"), associated with the respective speed-change frictional engaging elements, for actuating the corresponding frictional engaging elements, i.e., clutches and brakes, independent of one another. These solenoid valves are operated in a similar manner to actuate the corresponding clutches or brakes, and therefore, only a solenoid valve for operating the first-speed clutch 33 will be described with reference to FIG. 4. And and a description of the other solenoid valves has been omitted for the sake of brevity.

Figure 4:
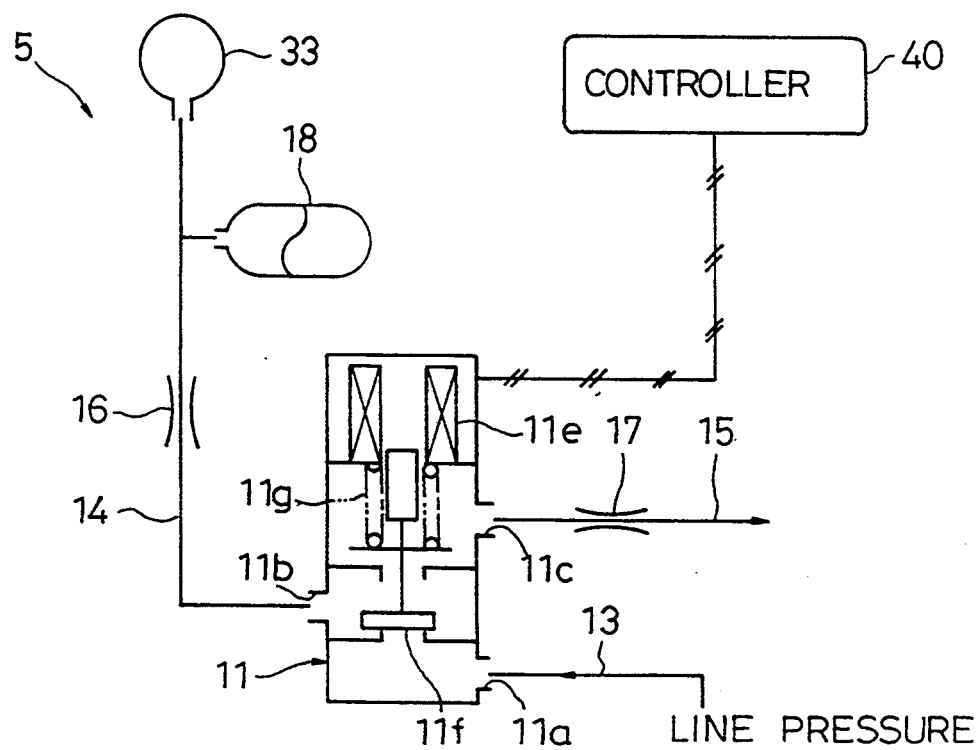
FIG. 4 is a schematic diagram showing part of a hydraulic circuit for actuating the clutch shown in FIGS. 2 and 3.

FIG. 4 illustrates part of the hydraulic circuit 5, in which is shown a solenoid valve 11 (hereinafter referred to as "first-speed solenoid valve") for controlling the application and release of hydraulic pressure to and from the first-speed clutch 33. The solenoid valve 11 is a normally-closed two-position changeover valve having three ports 11a to 11c.

The first port 11a is connected to a first oil passage 13 extending to an oil pump (not shown). A pressure regulating valve or the like, not shown, is arranged midway in the first oil passage 13, to supply operating oil of predetermined pressure (line pressure) to the first port 11a.

The second and third ports 11b and 11c are connected, respectively, to, a second oil passage 14 extending to the first-speed clutch 33, and a third oil passage 15 extending to an oil tank (not shown). Orifices 16 and 17 are provided in the middle of the second and third oil passages 14 and 15, respectively. The flow passage area of the orifice 16 in the second oil passage 14 is set to be greater than that of the orifice 17 provided in the third oil passage 15. An accumulator 18 is arranged in the second oil passage 14 between the first-speed clutch 33 and the orifice 16.

The solenoid valve 11 is electrically connected to the controller 40 and is subjected to duty-factor control at a predetermined frequency, e.g., at 50 Hz. When a solenoid 11e of the solenoid valve 11 is de-energized, a valve plug 11f is displaced by a return spring 11g, whereby the communication between the first and second ports b and 11b is blocked while the second port 11b is connected to the third port 11c. When the solenoid 11e is energized, the valve plug 11f lifts against the urging force of the return spring 11g, whereby the first and second ports 11a and 11b are connected with each other while the communication between the second and third ports 11b and 11c is blocked.

The controller 40 includes therein memories such as a ROM and a RAM, a central processing unit, input/output devices, and counters serving as timers, none of which are shown. Various sensors such as an Nt sensor 21, an No sensor 22, and a θt sensor 23 are electrically connected to the input side of the controller 40.

The Nt sensor 21 is a turbine speed sensor for detecting the rotational speed Nt of the turbine (i.e., the input shaft of the gear transmission 3) of the torque converter 4, and the No sensor 22 is a transfer drive gear speed sensor for detecting the rotational speed No of a transfer drive gear (not shown). The controller 40 is operable to calculate a vehicle speed V based on the rotational speed No. The θt sensor 23 is a throttle opening sensor for detecting the opening θt of a throttle valve arranged in an intake passage, not shown, of the engine 1. These sensors 21 to 23 supply detection signals to the controller 40 at predetermined intervals of time.

The memory of the controller 40 prestores a control program for the engaging-side frictional engaging elements and a control program for the disengaging-side frictional engaging elements, which are used for a downshift from a higher-speed gear stage to a lower-speed gear stage, in this embodiment, from the second speed to the first speed. The controller 40 repeatedly executes these control programs at predetermined intervals of cycle, to carry out a changeover of the clutch connection between the engaging-side (first-speed) clutch 33 and the disengaging-side (second-speed) clutch 34, and thereby effecting shift change or gear-changing in the automatic transmission 2.

Each of the control programs is generally composed of four procedures, i.e., first to fourth procedures. The first procedure covers a period up to the time at which the controller 40 determines that a shift or speed change must be carried out (before time point of a in FIG. 13); the second procedure covers a period up to the time by which the disengaging-side clutch 34 is completely disengaged and the transmission torque therethrough becomes zero or the dead space elimination of the engaging-side clutch 33 is completed (between time points a and b in FIG. 13); the third procedure covers a period in which the changeover of clutch connection is carried out until the turbine rotational speed Nt becomes synchronized with a rotation speed associated with the first-speed (between time points b and d in FIG. 13); and the fourth procedure covers a period up to the time at which the changeover of clutch connection is completed (between time points d and f in FIG. 13).

Now, how the controller 40 carries out a shift of the automatic transmission 2 will be described.

Engaging-side Speed Change Control

First, referring to FIGS. 5 through 12 together with FIG. 13, the control operation for the engaging-side frictional engaging elements will be explained. The controller 40 repeatedly executes a routine for the solenoid valve associated with the first-speed clutch 33, to control the first-speed solenoid valve 11.

The controller 40 first executes the first procedure of the control routine. Specifically, in Step S60 in FIG. 5, the controller 40 determines whether a flag IZA takes a value greater than or equal to "1". While the controller 40 carries out a downshift in accordance with this program, i.e., during execution of the second or subsequent procedure, the flag IZA is set to a value greater than or equal to "1", as described later. Accordingly, when the first procedure is executed to detect a speed change command for downshift, the flag IZA is set to "0", and the program proceeds to Step S61.

In Step S61, the controller 40 determines based on, e.g., the vehicle speed V and the throttle opening θt, whether a downshift from the second to the first speed is required. If it is concluded based on the current drive state of the vehicle that the second speed should desirably be maintained and a downshift to the first speed is unnecessary, that is, no speed change command is generated, the controller 40 ends the execution of this routine and re-executes the routine upon lapse of the predetermined interval. Namely, the controller 40 repeatedly executes the first process until a speed change command for downshift is detected in Steps S61.

If it is determined in Step S61 that a downshift from the second to the first speed is required (at time a in FIG. 13), the program proceeds to Step S62 (i.e., from the first procedure to the second procedure). When a speed change command to downshift from the second to the first speed is generated, the controller 40 starts the counter to measure the time Ta elapsed from the generation of the speed change command.

In the second procedure, the controller 40 drives the first-speed solenoid valve 11 at a 100% duty factor to supply the highest possible hydraulic pressure to the first-speed clutch 33, so that the dead space of the first-speed clutch 33 is eliminated in the shortest possible time. In this case, the controller 40 controls the start time for actuation of the first-speed solenoid valve 11 such that the dead space elimination of the first-speed clutch 11 and disengagement of the second-speed clutch 34, described later, are completed simultaneously, at the time b in FIG. 13.

In Step S62, the controller 40 sets the flag IZA to "1", whereby the flag IZA indicates that a downshift is under execution.

Then, in Step S64, the controller 40 reads various stored values from the memory. Specifically, the controller 40 reads times Tf, T0′, T1 and T2, and duty factors Da0, De and Dka. The time Tf represents dead space elimination time of the first-speed clutch 33; the time T0′ represents the hydraulic pressure release time of the second-speed clutch 34; the times T1 and T2 represent duty-factor output times used for engagement of the first-speed clutch 33 in the fourth procedure; the duty factor Da0 represents an initial duty factor at which the first-speed solenoid valve 11 for controlling the first-speed clutch 33 is subjected to feedback control after the dead space of the first-speed clutch 33 is eliminated; the duty factor De represents a duty factor at which the first-speed solenoid valve 11 for controlling the clutch 33 is actuated after it is determined that the turbine rotational speed Nt has become synchronized with the first-speed synchronous rotation speed; and the duty factor Dka represents a minimum duty factor (hold duty factor) used for maintaining the position of the first-speed clutch 33 against the urging force of the return spring 53.

Preferably, the dead space elimination times Tf and Tf', and the hydraulic pressure release times T0 and T0' for the respective clutches 33, 34 are corrected on the basis of the temperature of operating oil supplied to the clutches 33 and 34, the rotational speed of the oil pump, and the like. The temperature of the operating oil greatly affects the viscosity thereof which in turn greatly affects the buildup time of the operating oil pressure applied to the clutches and the like. The lower the operating oil temperature, the larger the times Tf, Tf', T0, and T0' are set to. Correction coefficients used are experimentally determined. The rotational speed of the oil pump, on the other hand, greatly affects the discharge pressure and displacement thereof. In the case of using a large-capacity oil pump capable of producing a sufficient discharge pressure even during low-speed rotation, no particular problem arises, but in the case of using a low-capacity oil pump, correction is required. In this case, the lower the rotational speed than a predetermined rotational speed, the larger the correction coefficient must be set to. Further, the times Tf and Tf' are corrected by learning control, to be able to cope with change of the clutches which occurs with passage of time. For such learning control, the learning method disclosed in U.S. Pat. No. 4,943,920 can be used.

The duty factor De is determined from a predetermined map stored in memory, in accordance with, e.g., the engine load and the torque of the turbine input shaft. The engine torque can be determined based on, e.g., the throttle opening $\theta t$ detected by the $\theta t$ sensor 23, and the intake air quantity detected by an airflow sensor, not shown.

Subsequently, in Step S65, the controller 40 reads the elapsed time Ta measured by the counter, and the program proceeds to Step S70 in FIG. 6.

In Step S70, the controller 40 determines whether the second procedure has ended. Specifically, the controller 40 determines whether the elapsed time Ta is longer than the dead space elimination time Tf of the first-speed clutch 33 and at the same time longer than the hydraulic pressure release time T0' of the second-speed clutch 34. If the result of the determination is No, i.e., if the dead space elimination of the first-speed clutch 33 is not yet completed and the release of hydraulic pressure from the second-speed clutch 34 also is not complete, the program proceeds from Step S70 to Step S80 in FIG. 7 each time the routine is executed, thereby continuing the dead space elimination of the first-speed clutch 33.

In Steps S80 to S83, the controller 40 checks the lengths of the dead space elimination time Tf of the first-speed clutch 33 and the hydraulic pressure release time T0' of the second-speed clutch 34, and controls the start time for releasing the operating oil pressure from the second-speed clutch 34 and the start time for elimination of the dead space of the first-speed clutch 33, such that the second-speed clutch 34 is completely disengaged. Thus, the torque transmitted therethrough becomes zero simultaneously with completion of the dead space elimination of the first-speed clutch 33, in order to smoothly switch the clutch connection between the clutches 33 and 34.

Figure 13:
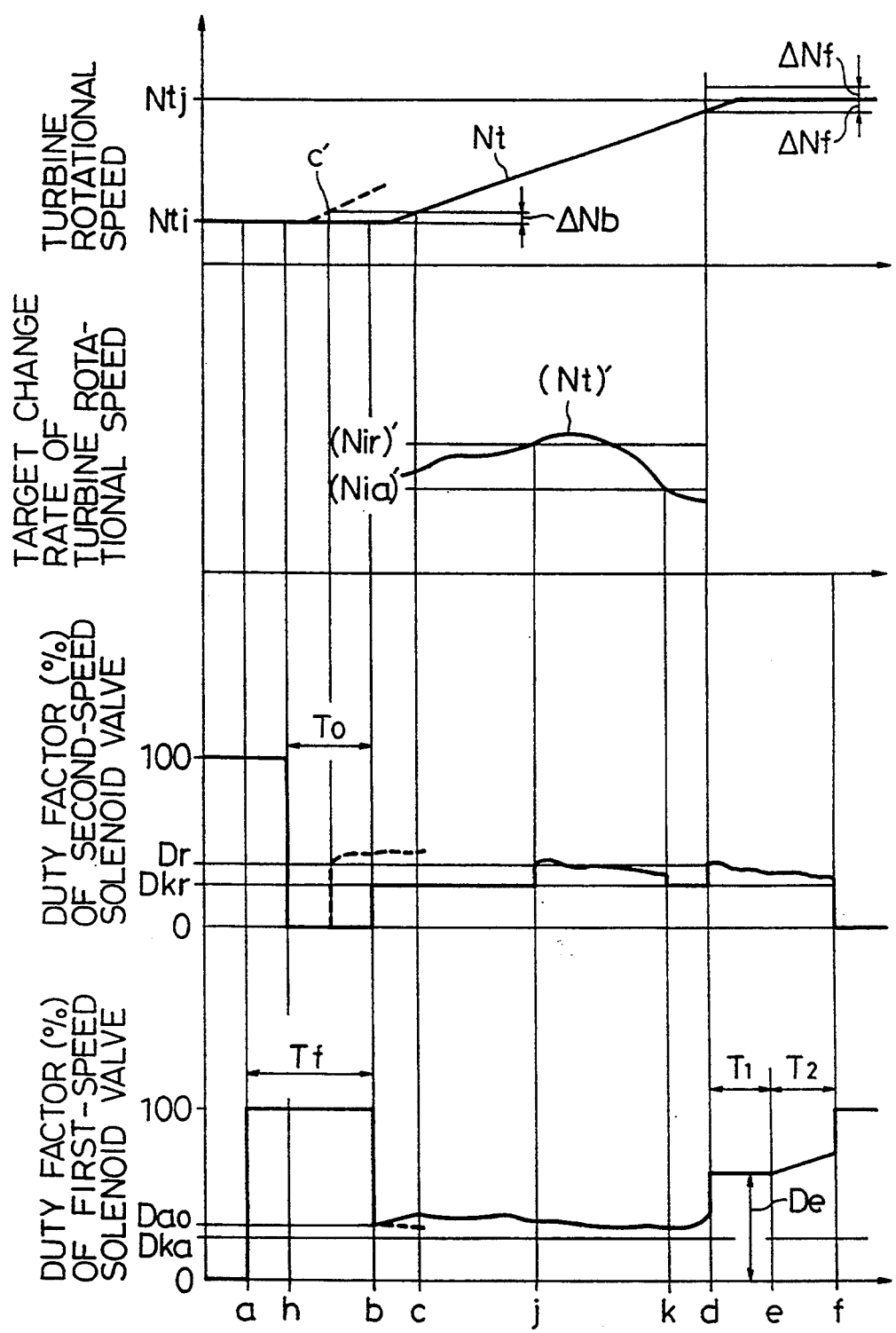
FIG. 13 is a chart showing changes in duty factor of first-speed and second-speed solenoid valves and in turbine rotational speed during a downshift.
Figure 28:
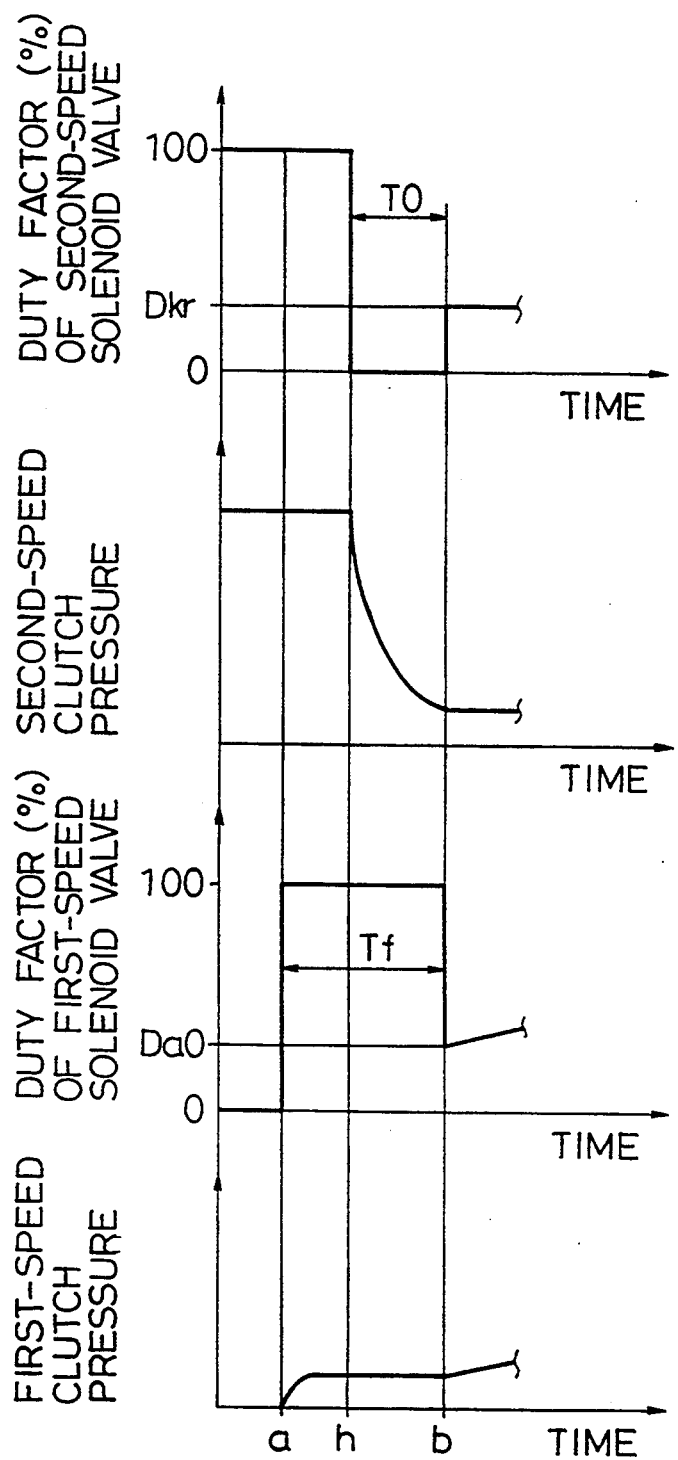
FIG. 28 is a chart showing time-based changes in duty factor of the solenoid valves and clutch pressures when a hydraulic-pressure release time T0' of the second-speed clutch is shorter than or equal to a dead-space elimination time Tf of the first-speed clutch.

FIGS. 13 and 28 illustrate a case where the dead space elimination time Tf of the first-speed clutch 33 is longer than the hydraulic pressure release time T0' of the second-speed clutch 34. In this case, after the dead space elimination of the first-speed clutch 33 is started, release of the hydraulic pressure from the second-speed clutch 34 is started upon lapse of the time (Tf−T0') (i.e., at time h). Thus the dead space elimination of the first-speed clutch 33 and the release of hydraulic pressure from the second-speed clutch 34 can be completed simultaneously at the time b in the figures.

In the case illustrated in FIGS. 13 and 28, the result of the determination in Step S80 becomes No, and the program proceeds to Step S81. In Step S81, the controller 40 actuates the first-speed solenoid valve 11 at a 100% duty factor, whereby the dead space elimination of the first-speed clutch 33 is started before the release of hydraulic pressure from the second-speed clutch 34 is started. As a result, the operating oil pressure in the first-speed clutch 33 begins to rise (FIG. 28).

Figure 5:
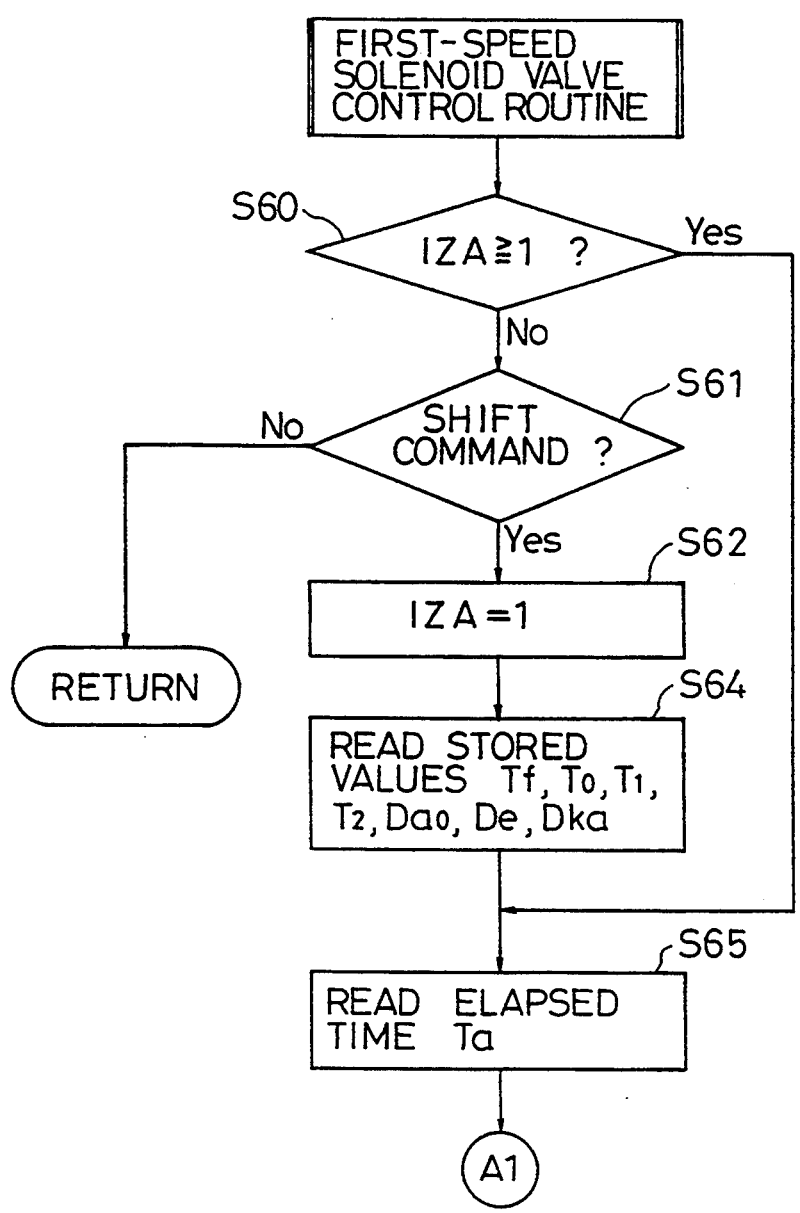
FIG. 5 is a flow chart showing part of a first-speed clutch control routine executed by a controller shown in FIGS. 1 and 4.

After executing Step S81, the controller 40 ends the execution of the routine. When the routine is executed next upon lapse of the predetermined interval, the condition of Step S60 in FIG. 5 is fulfilled, because the flag IZA has been set to "1" in Step S63 executed immediately after generation of the speed change command. Accordingly, the program proceeds from Step S60 to Step S65. The controller 40 then executes Step S70 in FIG. 6 and Steps S80 and S81 in FIG. 7, thereby continuing the dead space elimination of the first-speed clutch 33. This dead space elimination is continuously carried out for the period between time a and time b in FIGS. 13 and 28 as the second procedure progresses.

While the dead space of the first-speed clutch 33 is eliminated, a large amount of operating oil is supplied to the clutch 33. However since the piston 52 moves forward in response to the supply of operating oil, the operating oil pressure in the first-speed clutch 33 changes almost constantly, as shown in FIG. 28.

When it is determined in Step S80 that the hydraulic pressure release time T0' of the second-speed clutch 34 is longer than the dead space elimination time Tf of the first-speed clutch 33, the program proceeds to Step S82. In this case, in order to make the time at which the second-speed clutch 34 is completely disengaged coincident with the time at which the dead space elimination of the first-speed clutch 33 is completed at time b' in FIG. 29, the dead space elimination of the first-speed clutch 33 must be started upon lapse of the time (T0'−Tf) after the release of hydraulic pressure from the second-speed clutch 34 is started (i.e., at time h').

Accordingly, the dead space elimination of the first-speed clutch 33 is not carried out before the elapsed time Ta reaches the time (T0'−Tf), and when the condition of Step S82 is not fulfilled, the program proceeds to Step S83 wherein the controller 40 drives the first-speed solenoid valve 11 at a 0% duty factor. The controller 40 repeats the program and executes Step S83 until the condition of Step S82 is fulfilled, whereby the duty factor of the first-speed solenoid valve 11 remains at 0% until the elapsed time Ta reaches the time (T0'−Tf).

When the elapsed time Ta becomes longer than the time (T0'−Tf) and thus the condition of Step S82 is fulfilled while program is repeatedly executed, the program proceeds from Step S82 to Step S81. Accordingly, while repeatedly executing the program, the controller 40 continuously actuates the first-speed solenoid valve 11 at 100% duty factor for the dead space elimination time Tf. Thus, the second procedure progresses.

When the time b in FIG. 13 is reached as the elapsed time Ta increases, the dead space elimination of the first-speed clutch 33 is complete, and also the disengagement of the second-speed clutch 34 is complete, as described later. Accordingly, the result of the determination in Step S70 becomes Yes, and the program proceeds from the second procedure to the third procedure.

Upon entering the third procedure, Step S71 is executed wherein the controller 40 determines whether the flag IZA is equal to "4". Immediately after the program proceeds from the second procedure to the third procedure, the flag IZA is still "1" and the turbine rotational speed Nt is usually not deviated from a synchronous rotation speed associated with the second speed. Accordingly, after executing Steps S71 to S75, the program proceeds to Step S90 in FIG. 8.

In Step S90, the controller 40 sets the flag IZA to "2", and then executes Step S91. In Step S91, the controller 40 sets the duty factor Da of the first-speed solenoid valve 11 to the initial duty factor Da0, and then executes Step S92 wherein it is determined whether the duty factor Da takes a value greater than or equal to the hold duty factor Dka. In the duty factor Da is greater than or equal to the hold duty factor Dka, the program proceeds to Step S94, without executing Step S93.

When it is determined in Step S92 that the duty factor Da is smaller than the hold duty factor Dka, the program proceeds to Step S93. If the first-speed solenoid valve 11 is driven at the duty factor Da while the duty factor Da is smaller than the hold duty factor Dka, the position of the piston 52 of the first-speed clutch 33 cannot be maintained against the urging force of the return spring 53, so that the clutch plates 50a and clutch discs 50b of the frictional engaging plates 50 are separated from one another, requiring the dead space to be eliminated again. Therefore, in Step S93, the controller 40 sets the duty factor Da to the hold duty factor Dka at which a minimum oil pressure is supplied such that the position of the piston 52 can be retained, and the program proceeds to Step S94.

In Step S94, the controller 40 actuates the first-speed solenoid valve 11 at the duty factor Da. Namely, in this case, the controller 40 actuates the solenoid valve 11 at the initial duty factor Da0 (or Dka) (at time b in FIG. 13). After executing Step S94, the controller 40 ends execution of the routine.

Figure 6:
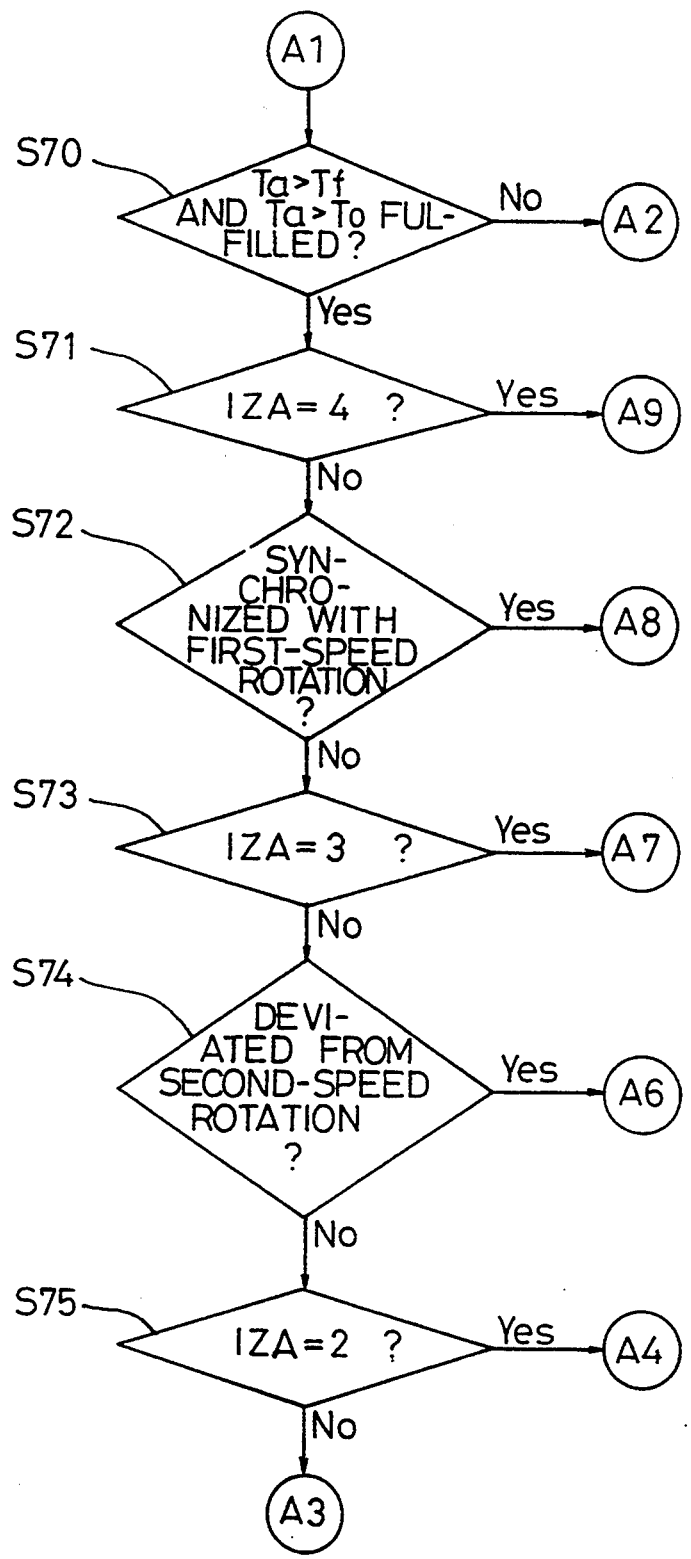
FIG. 6 is a flow chart showing another part of the first-speed clutch control routine subsequent to FIG. 5.
Figure 7:
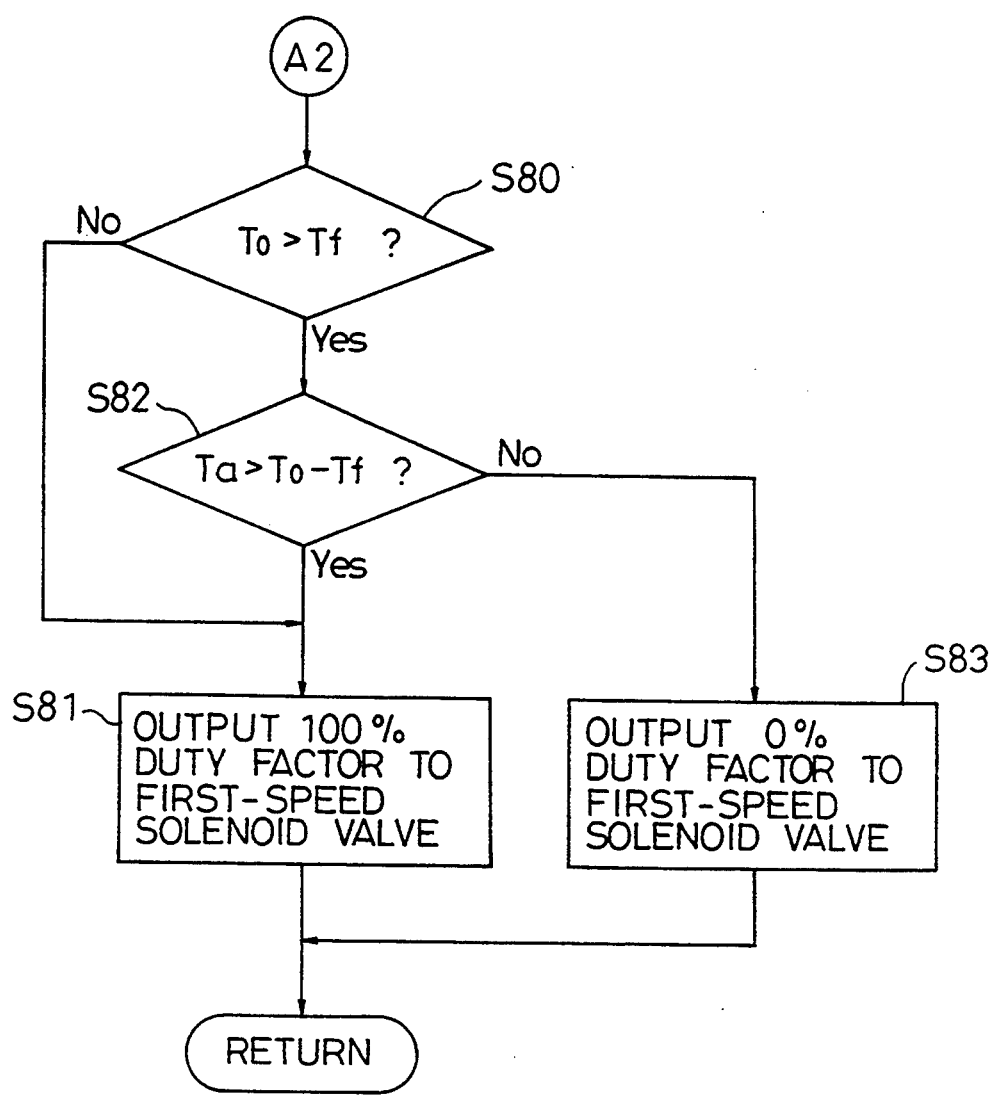
FIG. 7 is a flow chart showing still another part of the first-speed clutch control routine subsequent to FIG. 6.
Figure 8:
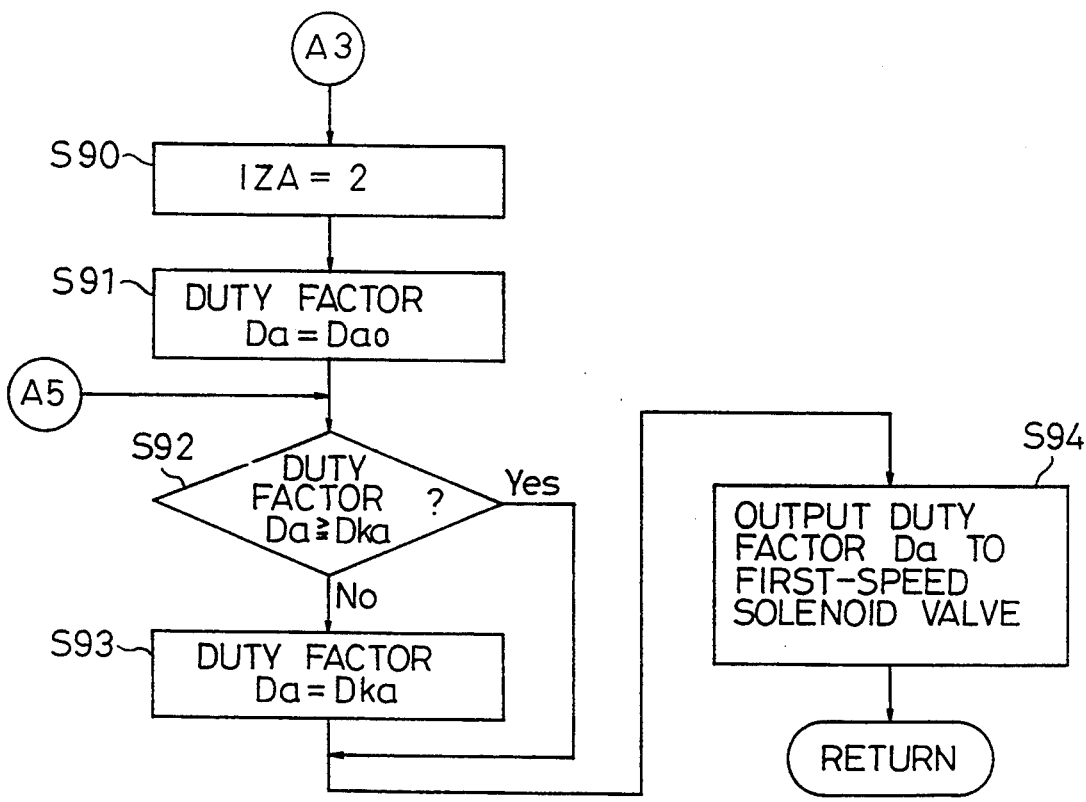
FIG. 8 is a flow chart showing a further part of the first-speed clutch control routine subsequent to FIG. 6.
Figure 9:
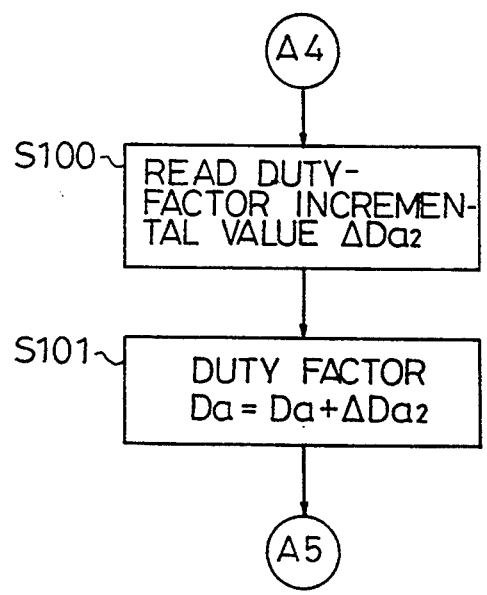
FIG. 9 is a flow chart showing part of the first-speed clutch control routine subsequent to FIG. 6.

When the routine is executed next, the program proceeds to Steps S60 and S65 in FIG. 5 and Steps S70 to S75 in FIG. 6. Since the flag IZA has been set to "2" in Step S90, the condition of Step S75 is fulfilled, and the program proceeds to Step S100 in FIG. 9.

In Step S100, the controller 40 reads a duty-factor incremental value ΔDa2, which is predetermined according to modes of downshift such as a second-to-first downshift or a third-to-second downshift. Then, the controller 40 obtains a new duty factor Da by adding the incremental value ΔDa2 to the previous duty factor Da, in Step S101, and the program proceeds to Step S92 in FIG. 8. Executing Steps S92 and S94, the controller 40 actuates the first-speed solenoid valve 11 at the duty factor Da.

The controller 40 successively increases the duty factor Da of the first-speed solenoid valve 11, by ΔDa2 at each control interval, until deviation of the turbine rotational speed Nt from the second-speed synchronous rotation speed is detected (from time b to time c in FIG. 13). As a result, engagement of the first-speed clutch 33, which has moved to the position where no dead space exists, gradually progresses, and the transmission torque through the first-speed clutch 33 is generated even if the engine 1 is in a power-off state, whereby the turbine rotational speed Nt becomes deviated from the second-speed synchronous rotation speed Nti and changes toward the first-speed synchronous rotation speed Ntj (FIG. 13).

When the rotational deviation progresses and the difference between the turbine rotational speed Nt and the second-speed synchronous rotation speed Nti becomes equal to ΔNb, the condition of Step S74 in FIG. 6 is fulfilled, and the controller 40 detects such a deviation from the second-speed synchronous rotation speed (at time c in FIG. 13). Upon detecting the deviation from the second-speed synchronous rotation speed, the program proceeds to Step Si10 in FIG. 10.

In Step Si10, the controller 40 sets the flag IZA to "3", and then rewrites the initial duty factor Da0 to the latest duty factor Da. To quickly start the speed change control (the feedback control of the transmission torque through the first-speed clutch 33), the initial duty factor Da0 should preferably be set to a value as close to the duty factor best suited for starting the feedback control as possible. To this end, the duty factor applied at the time of detection of the deviation from the synchronous rotation speed, i.e., at the start of shift operation, is learned each time the speed change control is executed, and the learned value is successively updated as the initial duty factor Da0 and stored (Step S111).

Then, in Step S111a, the controller 40 resets deviations (Ge)n−1 and (Gi)n−1 of the preceding cycle, mentioned later, individually to an initial value of "0".

The program then proceeds to Step S112 wherein the controller 40 obtains a rate (Nt)′ of change in the turbine rotational speed Nt. Specifically, the controller 40 obtains an actual change rate (Nt)′ of turbine rotational speed, which is a time-based differential value of the turbine rotational speed Nt, based upon the turbine rotational speed Nt detected in the preceding cycle and that detected in the present cycle. Symbol (Nt)′ thus represents the time-based differential value of the rotational speed Nt, and in the following, other time-based differential values are expressed in a similar manner.

Subsequently, in Step S113, the controller 40 reads a target change rate (Nia)′ of turbine rotational speed. The target change rate (Nia)′ is predetermined according to individual downshift modes and prestored in the memory of the controller 40. The program then proceeds to Step S114, in which the controller 40 obtains a duty-factor correction amount (feedback correction amount) ΔDaf based upon the difference between the actual change rate (Nt)′ and the target change rate (Nia)′ of turbine rotational speed. The correction amount ΔDaf can be calculated in various ways and there is no particular restriction on the calculation method; for example, a calculation method used in conventional PID control may be used to obtain the correction amount.

Figure 14:
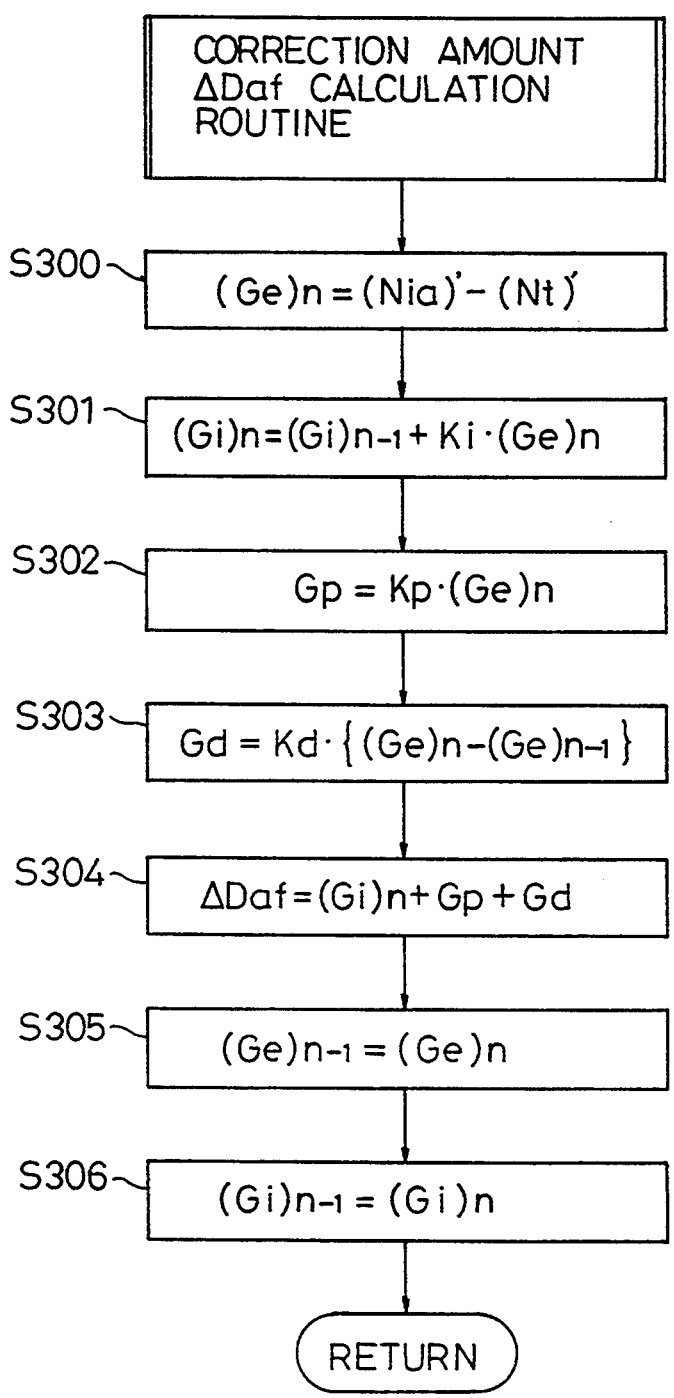
FIG. 14 is a flow chart of a correction amount ΔDaf calculation routine executed in Step S114 in FIG. 10.
Figure 15:
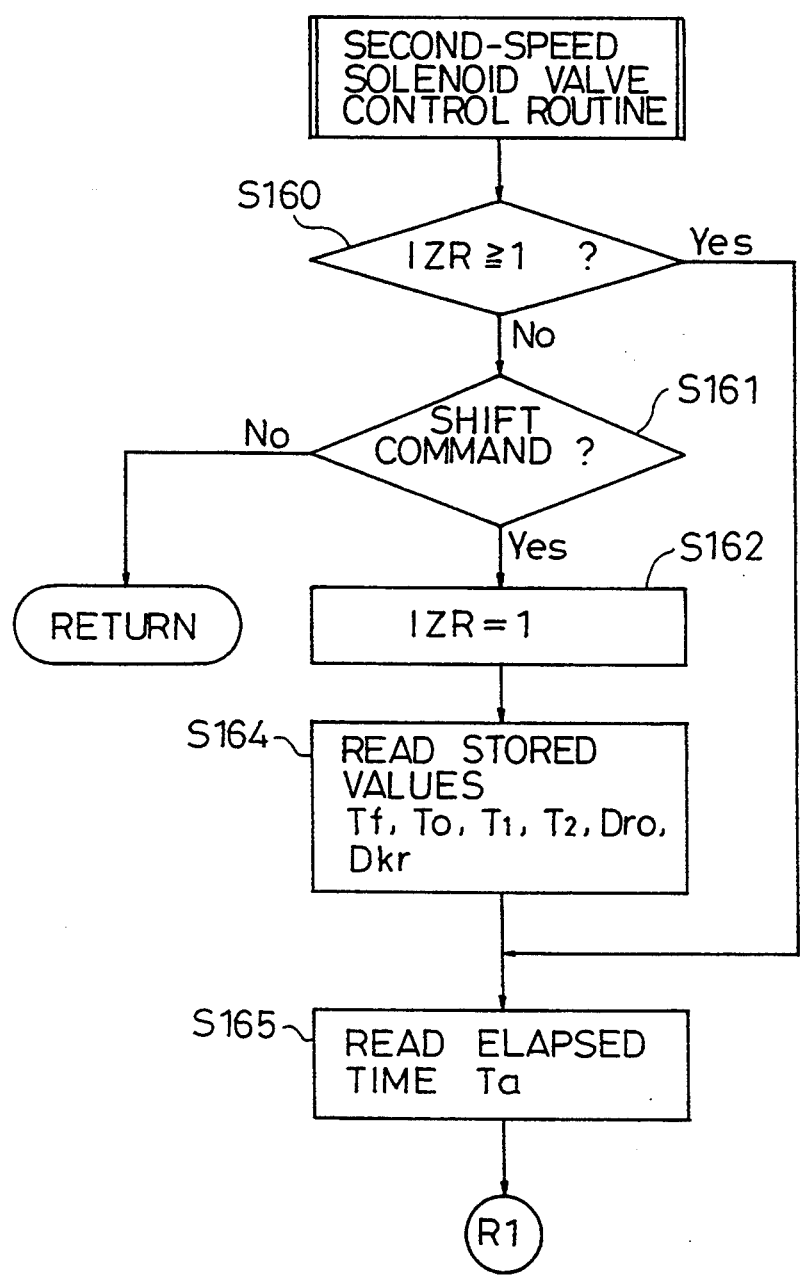
FIG. 15 is a flow chart showing part of a second-speed clutch control routine executed by the controller.

FIG. 14 illustrates a specific example of the correction amount calculation procedure used in PID control. First, in Step S300, the controller 40 subtracts the actual change rate (Nt)′ from the target change rate (Nia)′ of turbine rotational speed to obtain a deviation (Ge)n of the present cycle, and then executes Steps S301 to S303 to obtain an integral correction amount (Gi)n, a proportional correction amount Gp, and a differential correction amount Gd.

More specifically, in Step S301, the controller 40 adds a value obtained by multiplying the deviation (Ge)n of the present cycle by a predetermined coefficient Ki to the integral correction amount (Gi)n−1 of the preceding cycle, to thereby obtain an integral correction amount (Gi)n of the present cycle. Then, in Step S302, the deviation (Ge)n of the present cycle is multiplied by a predetermined coefficient Kp to obtain a proportional correction amount Gp. In Step S303, a value obtained by subtracting the deviation (Ge)n−1 of the preceding cycle from the deviation (Ge)n of the present cycle is multiplied by a predetermined coefficient Kd to obtain a differential correction amount Gd. Then, in Step S304, the controller 40 adds together the integral correction amount (Gi)n, the proportional correction amount Gp and the differential correction amount Gd to obtain the duty factor correction amount ΔDaf. The coefficients Ki, Kp and Kd are preset values determined experimentally.

Subsequently, in Step S305, the controller 40 sets and stores the deviation (Ge)n obtained in the present cycle as the deviation (Ge)n−1 of the preceding cycle, which has been reset in Step S111a, and in Step S306, sets and stores the integral correction amount (Gi)n obtained in the present cycle as the integral correction amount (Gi)n−1 of the preceding cycle, which also has been reset in Step S111a, followed by termination of the correction amount calculation routine.

Referring again to FIG. 10, in Step S115, the controller 40 sets the sum of the initial value Da0 and the correction amount ΔDaf as the duty factor Da. Then, the program proceeds to Step S92 in FIG. 8 and executes Steps S92 to S94, to energize the first-speed solenoid valve 11 at the thus-set duty factor Da. Thus, the controller 40 initiates the feedback control to increase the turbine rotational speed Nt such that the change rate (Nt)' thereof becomes equal to the target change rate (Nia)'.

When the routine is executed next, the controller 40 successively executes Steps S60, S65 and S70 to S73. Since the flag IZA has been set to "3" in Step S110 as mentioned above, the program proceeds from Step S73 to Step S112 in FIG. 10.

Accordingly, Steps S112 to S115 and S92 to S94 are executed and the controller 40 carries out the feedback control of the duty factor Da of the first-speed solenoid valve 11 such that the change rate (Nt)' of turbine rotational speed becomes equal to the target change rate (Nia)'. Namely, the controller 40 repeatedly executes the program and continues the feedback control until synchronization of the turbine rotational speed Nt with the first-speed rotation speed Ntj is detected (time d in FIG. 13). Consequently, the engagement of the first-speed clutch 33 gradually progresses while the second-speed clutch 34 is operated in the manner described later, whereby the turbine rotational speed Nt increases as shown in FIG. 13.

When the turbine rotational speed Nt becomes close to the first-speed synchronous rotation speed Ntj, or more specifically, when the absolute value of the difference between the turbine rotational speed Nt and the first-speed synchronous rotation speed Ntj has become smaller than a predetermined value ΔNf (e.g., 50 rpm), the controller 40 determines that the turbine rotational speed Nt is synchronized with the first-speed synchronous rotation speed Ntj (at time d of FIG. 13). When such synchronization is detected, the result of the determination in Step S72 becomes Yes, and thus the program proceeds to Step S121 in FIG. 11 (the flow progresses from the third procedure to the fourth procedure). At this time, the controller 40 starts the counter to measure the time Tb elapsed from the entry into the fourth procedure.

In Step S121, the controller 40 sets the flag IZA to "4", and in Step S122, sets the duty factor De, read in Step S64, as the duty factor Da. Then, the controller 40 executes Steps S92 to S94 in FIG. 8 to energize the first-speed solenoid valve 11 at the duty factor Da (=De). Namely, at the time d in FIG. 13, the duty factor Da of the first-speed solenoid valve 11 is rapidly increased to the predetermined duty factor De.

Figure 12:
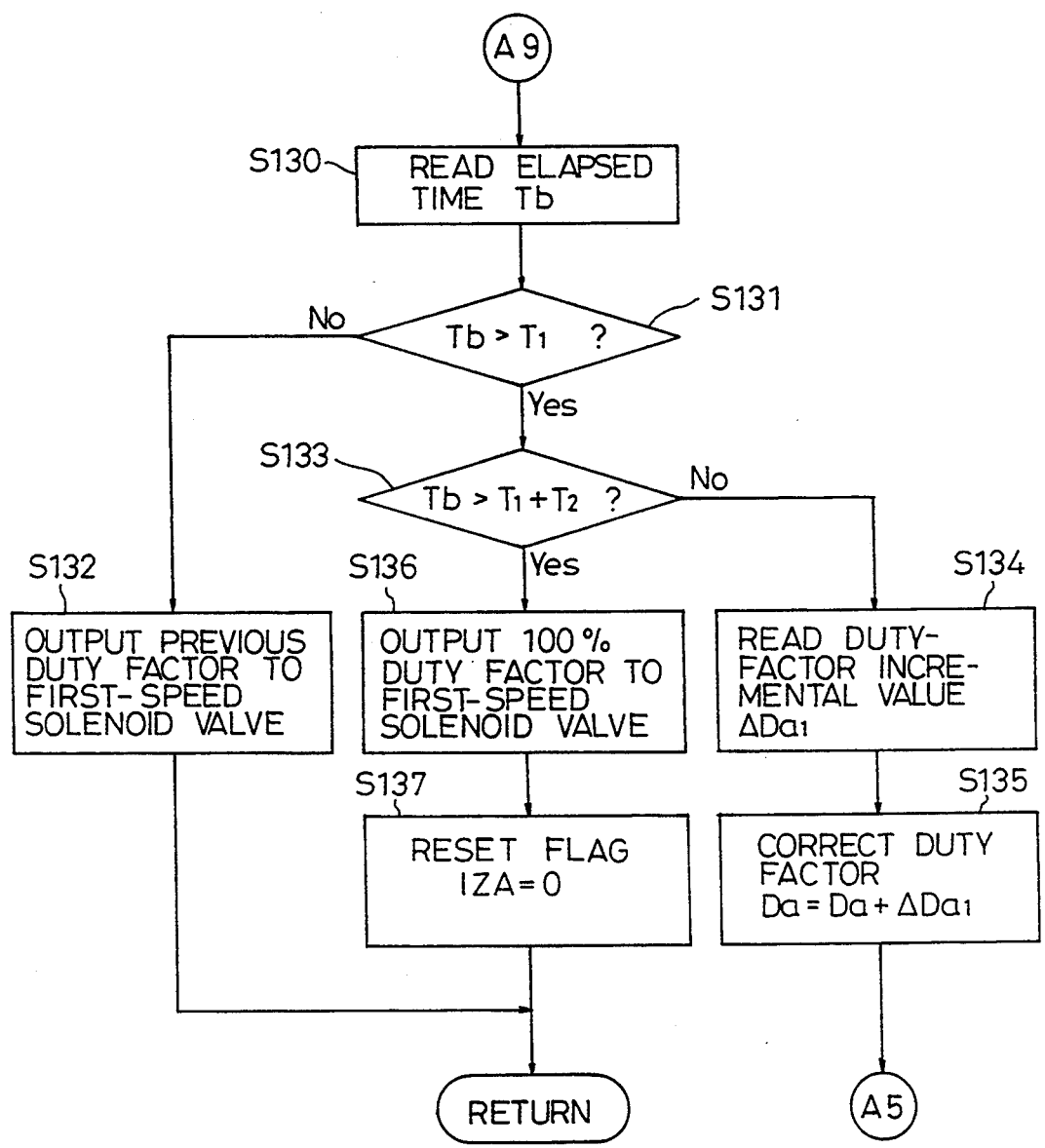
FIG. 12 is a flow chart showing the remaining part of the first-speed clutch control routine subsequent to FIG. 6.

Since the flag IZA has been set to "4" in Step S121, the result of the determination in Step S71 becomes Yes, and the program proceeds to Step S130 in FIG. 12.

In Step S130, the controller 40 reads the elapsed time Tb, and then in Step S131, compares the elapsed time Tb with the aforementioned duty-factor output time T1. Namely, the controller 40 repeatedly executes Steps S131 to S132 each time the routine is repeated until the elapsed time Tb reaches the predetermined time T1, thereby continuously driving the first-speed solenoid valve 11 at the duty factor Da output in the preceding cycle, i.e., the duty factor De (from time d to time e in FIG. 13).

When the elapsed time Tb reaches the time T1 (at time e), the program proceeds from Step S131 to Step S133 and the controller 40 determines whether the elapsed time Tb has reached the time (T1+T2). If this condition is not fulfilled, the controller 40 executes Step S134 to read a duty-factor incremental value ΔDa1. The duty-factor incremental value ΔDa1 is preset according to, e.g., individual modes of downshift, like the aforementioned incremental value ΔDa2.

Then, in Step S135, the controller 40 adds together the duty factor Da of the preceding cycle and the incremental value ΔDA1 to obtain a new duty factor Da. Subsequently, the controller 40 executes Steps S92 to S94 in FIG. 8 and energizes the first-speed solenoid valve 11 at the duty factor Da (=Da+ΔDa1).

The controller 40 repeatedly executes this routine until the elapsed time Tb reaches the time (T1+T2), to gradually increase the duty factor Da of the first-speed solenoid valve 11 at a predetermined rate (ΔDa1) and thereby gradually increase the operating oil pressure of the first-speed clutch 33 (from time e to time f in FIG. 13).

When the elapsed time Tb reaches the time (T1+T2) at f in FIG. 13, the condition of Step S133 is fulfilled and the program proceeds to Step S136. In Step S136, the controller 40 energizes the first-speed solenoid valve 11 at a 100% duty factor. Consequently, the first-speed clutch 33 is completely engaged, while the second-speed clutch 34 is completely disengaged as described later, whereby the changeover of clutch connection between the clutches 33 and 34 is completed and the downshift of the automatic transmission 2 from the second speed to the first speed is accomplished.

During the period from d to e shown in FIG. 13, the first-speed solenoid valve 11 need not be actuated continuously at the duty factor De; alternatively, the duty factor Da may be gradually increased, by a predetermined incremental value ΔDa1' at a time, during the period from d to f.

Subsequently, the program proceeds to Step S137, and the controller 40 sets the flag IZA to "0" and ends the execution of the routine.

Figure 10:
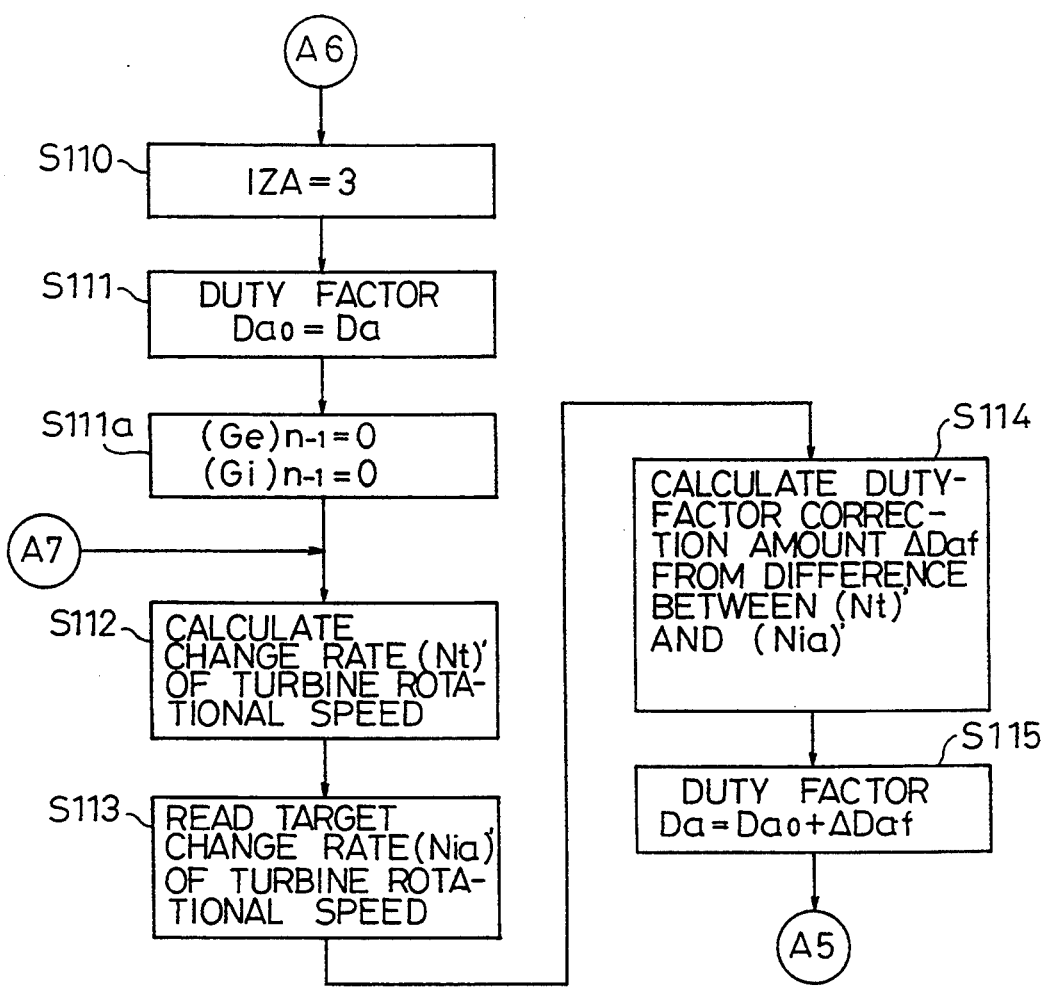
FIG. 10 is a flow chart showing another part of the first-speed clutch control routine subsequent to FIG. 6.
Figure 11:
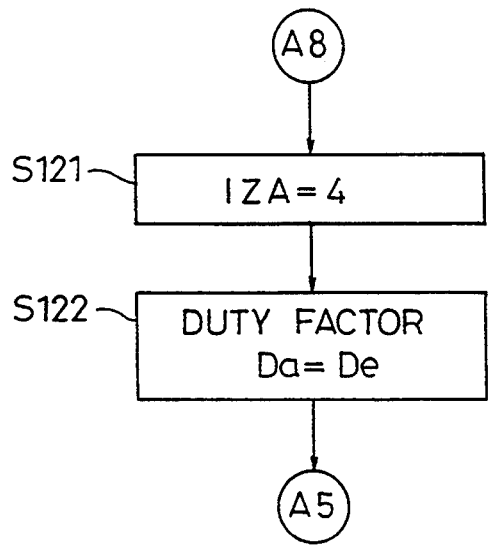
FIG. 11 is a flow chart showing still another part of the first-speed clutch control routine subsequent to FIG. 6.

In the case where the turbine rotational speed Nt starts to rise in the progress of the dead space elimination of the first-speed clutch 33 and is deviated from the second-speed synchronous rotation speed, as indicated by the dashed line in FIG. 13, the controller 40 executes Steps S70 (FIG. 6) and S71 to S74 upon completion of the dead space elimination, and immediately initiates the feedback control in Step S110 and the subsequent steps of FIG. 10.

Disengaging-side Speed Change Control

Referring now to FIG. 13 and FIGS. 15 through 26, the procedure for controlling the disengaging-side frictional engaging means will be explained. The controller 40 repeatedly executes the second-speed solenoid valve control routine, to thereby control the solenoid valve 11' (hereinafter referred to as the "second-speed solenoid valve") for actuating the second-speed clutch 34. As previously mentioned, the second-speed solenoid valve 11' has the same structure as the first-speed solenoid valve 11, and therefore, is not illustrated.

The controller 40 first executes the first procedure of this control routine. Namely, in Step S160 of FIG. 15, the controller 40 determines whether a flag IZR takes a value greater than or equal to "1". While the controller 40 carries out a downshift according to this control procedure, i.e., while the second or subsequent process is executed, the flag IZR is set to a value greater than or equal to "1" as described later. Thus, when the first procedure is being executed to determine the generation of a speed change command for downshift, the flag IZR is set to "0" and the controller 40 executes Step S161.

In Step S161, the controller 40 determines whether a speed change command to downshift from the second to the first speed has been generated, as in Step S61 of FIG. 5. When no speed change command is generated, the controller 40 ends the execution of this routine, and repeatedly executes the first procedure until generation of a speed change command for downshift is detected in Step S161.

When generation of the speed change command is detected (at time a in FIG. 13), the program proceeds from Steps S161 to Steps S162, i.e., from the first procedure to the second procedure. At this time, the controller 40 starts the counter to measure the time Ta elapsed from the generation of the speed change command.

The time Ta thus measured is identical with the elapsed time Ta used in the first-speed solenoid valve control routine, and accordingly, when the second procedure of the first-speed solenoid valve control routine is started, the time Ta measured in the engaging-side control routine is used as the time Ta for the disengaging-side control routine.

In the second procedure, the controller 40 actuates the second-speed solenoid valve 11' at a 0% duty factor to disengage the second-speed clutch 34 in the shortest possible time. In this case, the controller 40 controls the start time for actuating the second-speed solenoid valve 11' such that the disengagement of the second-speed clutch 34 and the dead space elimination of the first-speed clutch 33 are completed at the same time, i.e., at b in FIGS. 13 and 28, as mentioned before. This control operation will be described in detail later.

In Step S162, the controller 40 sets the flag IZR to "1", whereby the flag IZR indicates that the downshift is under execution. The controller 40 then reads various stored values in Step S164. More specifically, the controller 40 reads the times Tf, T0', T1 and T2, and the duty factors Dr0 and Dkr. As previously mentioned, the time Tf represents the dead space elimination time of the first-speed clutch 33; the time T0' represents the hydraulic pressure release time of the second-speed clutch 34; the duty factor Dr0 represents an initial duty factor for the second-speed solenoid valve 11' applied after the release of hydraulic pressure from the second-speed clutch 34; and the duty factor Dkr denotes a hold duty factor for holding the piston of the second-speed clutch 34 at the position where the transmission torque is zero.

Figure 16:
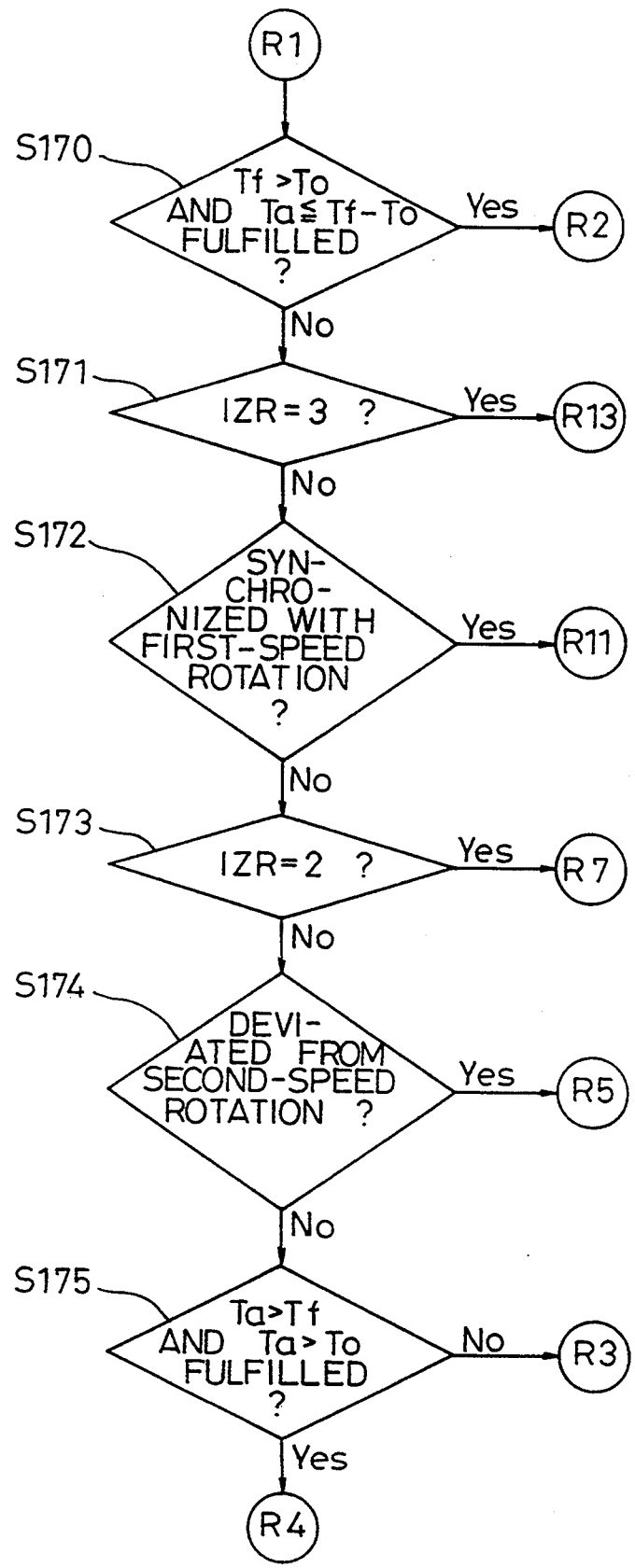
FIG. 16 is a flow chart showing another part of the second-speed clutch control routine subsequent to FIG. 15.

Then, after reading the elapsed time Ta in Step S165, the controller 40 executes Step S170 in FIG. 16.

In Step S170, the controller 40 determines whether the time for starting the disengagement of the second-speed clutch 34 has been reached. Specifically, the controller 40 determines whether the disengagement time T0' of the second-speed clutch 34 is shorter than the dead space elimination time Tf of the first-speed clutch 33 and at the same time the elapsed time Ta takes a value smaller than or equal to the time (Tf−T0').

In the case where the dead space elimination time Tf is longer than the disengagement time T0', disengagement of the second-speed clutch 34 must be started when the time (Tf−T0') has elapsed from the start of the dead space elimination of the first-speed clutch 33, in order to make the time at which the second-speed clutch 34 is completely disengaged and the time at which the dead space elimination of the first-speed clutch 33 is completed to be coincident with the time b.

Figure 17:
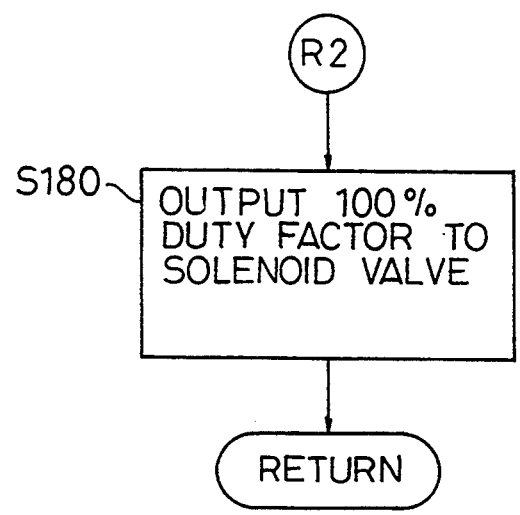
FIG. 17 is a flow chart showing still another part of the second-speed clutch control routine subsequent to FIG. 16.

In FIGS. 13 and 28 wherein the dead space elimination time Tf is longer than the disengagement time T0', while the elapsed time Ta remains shorter than the time (Tf−T0'), i.e., between time a and time h in FIG. 13, the controller 40 executes Step S180 in FIG. 17 and continuously energizes the second-speed solenoid valve at a 100% duty factor, whereby disengagement of the second-speed clutch 34 is suspended.

The controller 40 repeats the routine and executes Steps S160 and S165 (FIG. 15), Step S170 (FIG. 16) and Step S180 (FIG. 17) until the elapsed time Ta reaches the time (Tf−T0'), and thus the second-speed clutch 34 is maintained in an engaged state.

Figure 18:
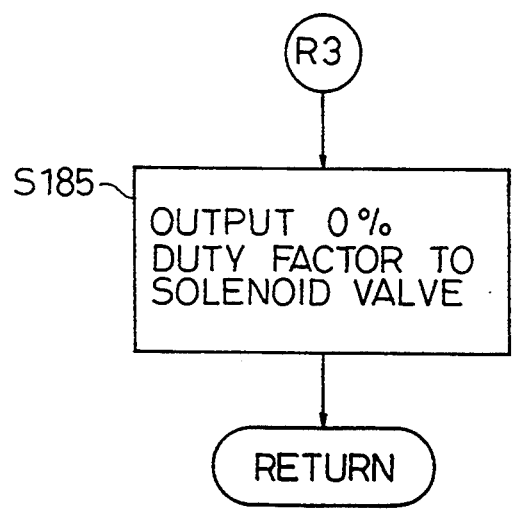
FIG. 18 is a flow chart showing a further part of the second-speed clutch control routine subsequent to FIG. 16.
Figure 29:
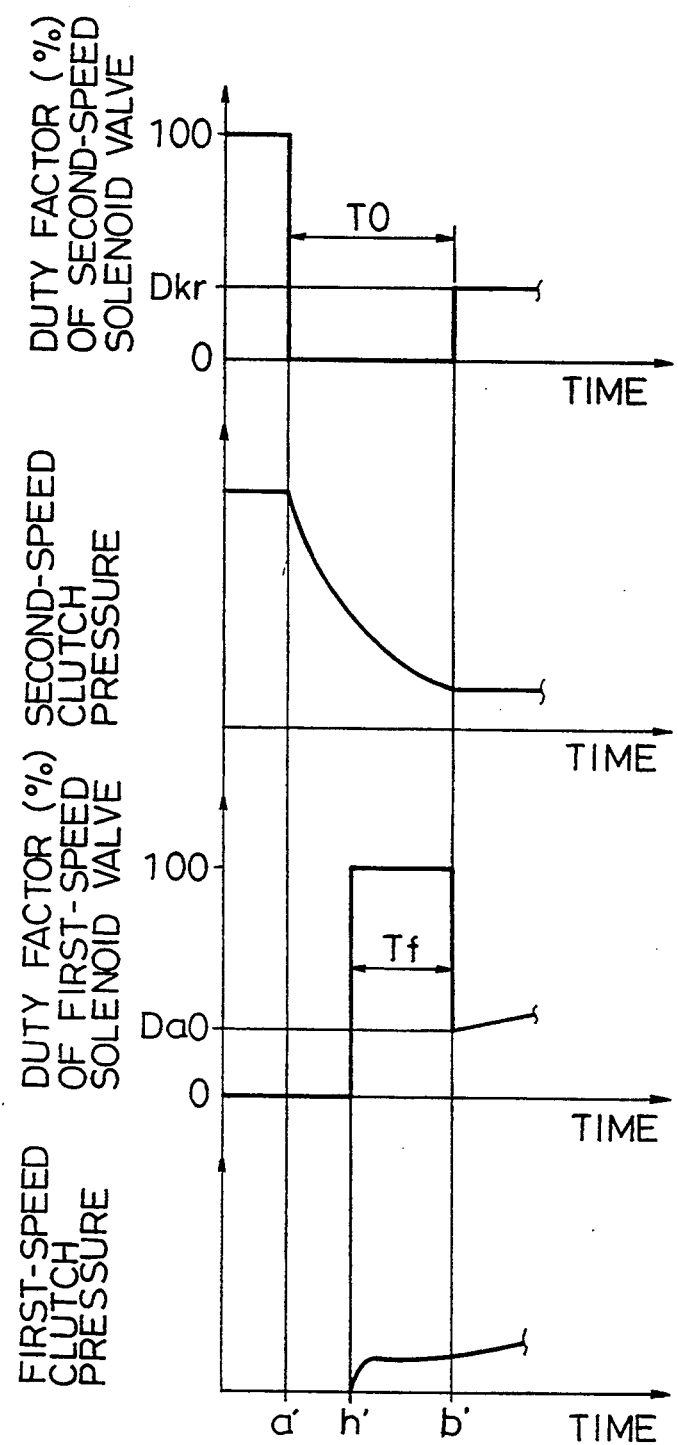
FIG. 29 is a chart showing time-based changes in duty factor of the solenoid valves and clutch pressures when the hydraulic-pressure release time T0' of the second-speed clutch is longer than the dead-space elimination time Tf of the first-speed clutch.

When the disengagement time T0' is longer than the dead space elimination time Tf as shown in FIG. 29, the program proceeds from Step S175, mentioned later, to Step S185 in FIG. 18, and the controller 40 sets the duty factor of the second-speed solenoid valve 11' to 0% to start the disengagement at time a' in the figure.

Referring to FIG. 13, when the elapsed time Ta reaches the time (Tf−T0') at h in the figure, the result of the determination in Step S170 becomes No, and the program proceeds to Step S171. Since the flag IZR has been set to "1" in Step S162, and since the turbine rotational speed Nt is usually not significantly deviated from the second-speed synchronous rotation speed Nti, the controller 40 executes Steps S171 to S174, and the program proceeds to Step S175.

In Step S175, the controller 40 determines whether the elapsed time Ta is longer than the time Tf and at the same time longer than the time T0'. Immediately after the elapsed time Ta reaches the time (Tf−T0'), the result of the determination in Step S175 becomes No. In this case, the program proceeds to Step S185 in FIG. 18 and the controller 40 operates the second-speed solenoid valve 11' at a 0% duty factor, to start disengagement of the second-speed clutch 34 (at time h in FIG. 13). Consequently, the operating oil pressure in the second-speed clutch 34 rapidly decreases (FIG. 28).

When operation of the second-speed solenoid valve 11' at 0% duty factor has been continued for the disengagement time T0' (at b in FIG. 13) while the controller 40 repeats the routine, the second-speed clutch 34 is completely disengaged and the transmission torque therethrough becomes zero, and at the same time the dead space elimination of the first-speed clutch 33 is completed as mentioned above. As a result, the switching of clutch connection between the clutches 33 and 34 is smoothly carried out, and the program proceeds from the second procedure to the third procedure.

Figure 19:
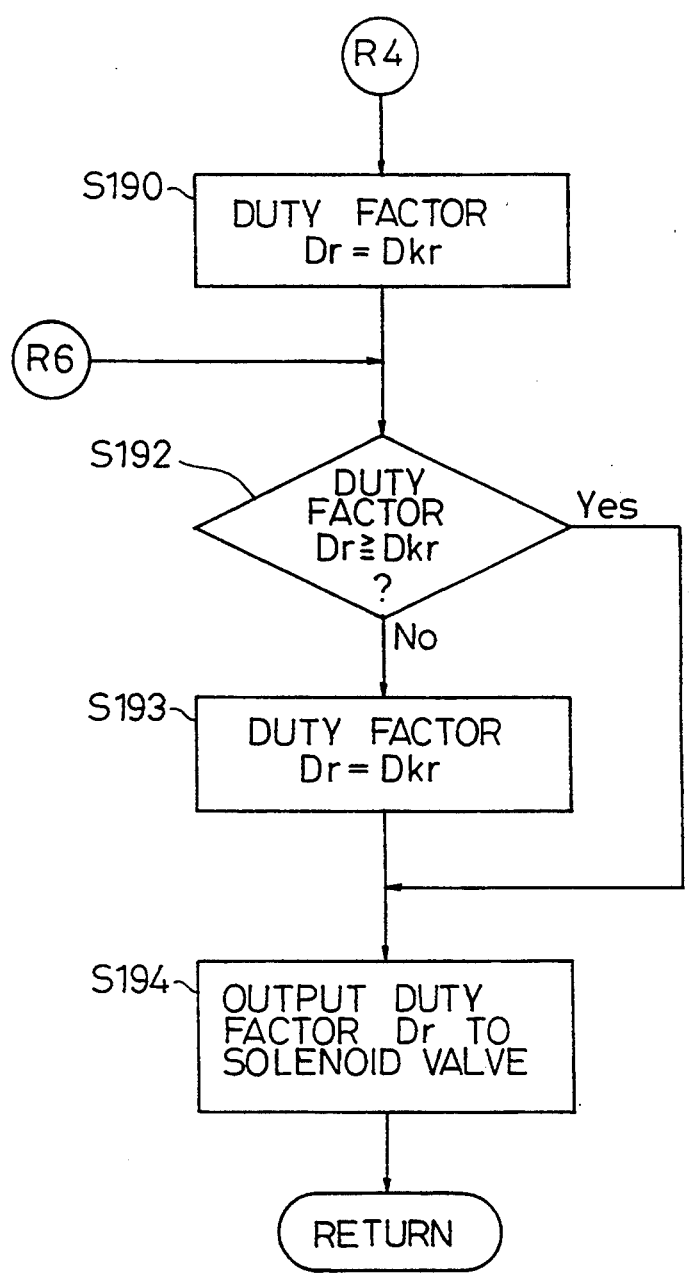
FIG. 19 is a flow chart showing part of the second-speed clutch control routine subsequent to FIG. 16.

When the condition of Step S175 in FIG. 16 is fulfilled, the controller 40 executes Step S190 in FIG. 19 and sets the read duty factor Dkr as a duty factor Dr for the second-speed solenoid valve 11'. When the second-speed solenoid valve is energized at the duty factor Dkr, the piston position and operating oil pressure of the second-speed clutch 34 are maintained. The piston of the second-speed clutch 34 is presently located at a position where the engagement is completely released, i.e., a position immediately before engaged state. Therefore, when the second-speed solenoid valve 11' is actuated at the duty factor Dkr, the piston of the second-speed clutch 34 is held at that position just before engaged state.

After setting the duty factor Dkr as the duty factor Dr, the controller 40 compares the duty factor Dr with the hold duty factor in Step S192, and executes Step S194. Specifically, in Step S192, the controller 40 determines whether the duty factor Dr takes a value greater than or equal to the hold duty factor Dkr. This determination is made to prevent the duty factor Dr of the second-speed solenoid valve 11' from being set to a value smaller than or equal to the hold duty factor Dkr during the feedback control described later.

If the duty factor Dr is set to a value smaller than the hold duty factor Dkr and the second-speed solenoid valve 11' is actuated at such a small duty factor Dr, then the piston of the second-speed clutch 34 cannot be maintained against the force of the return spring 53', so that the frictional engaging plates (the clutch plates 50a and the clutch discs 50b) are separated from one another. Thus, when engaging the second-speed clutch 34 again, dead space elimination must be carried out. Accordingly, when the duty factor Dr is greater than or equal to the hold duty factor Dkr, the program proceeds to Step S194, without executing Step S193. On the other hand, when the duty factor Dr is smaller than the hold duty factor Dkr, the controller 40 executes Step S193. This thereby sets the hold duty factor Dkr as the duty factor Dr so that the minimum oil pressure is supplied to hold the piston position. Subsequently the program then proceeds to Step S194.

In Step S194, the controller 40 actuates the second-speed solenoid valve 11' at the duty factor Dr. Immediately after the hydraulic pressure is released from the second-speed clutch 34 (at time b in FIGS. 13 and 28), the controller 40 energizes the solenoid valve 11' at the hold duty factor Dkr.

The controller 40 repeatedly executes this routine at predetermined control intervals, thereby continuously actuating the second-speed solenoid valve at the hold duty factor Dkr. This operation is continued at least until the controller 40 detects a deviation of the turbine rotational speed Nt from the second-speed synchronous rotation speed (at time c in FIG. 13). Thus, the second-speed clutch 34 is held at the position immediately before engaged state, as mentioned above.

Figure 20:
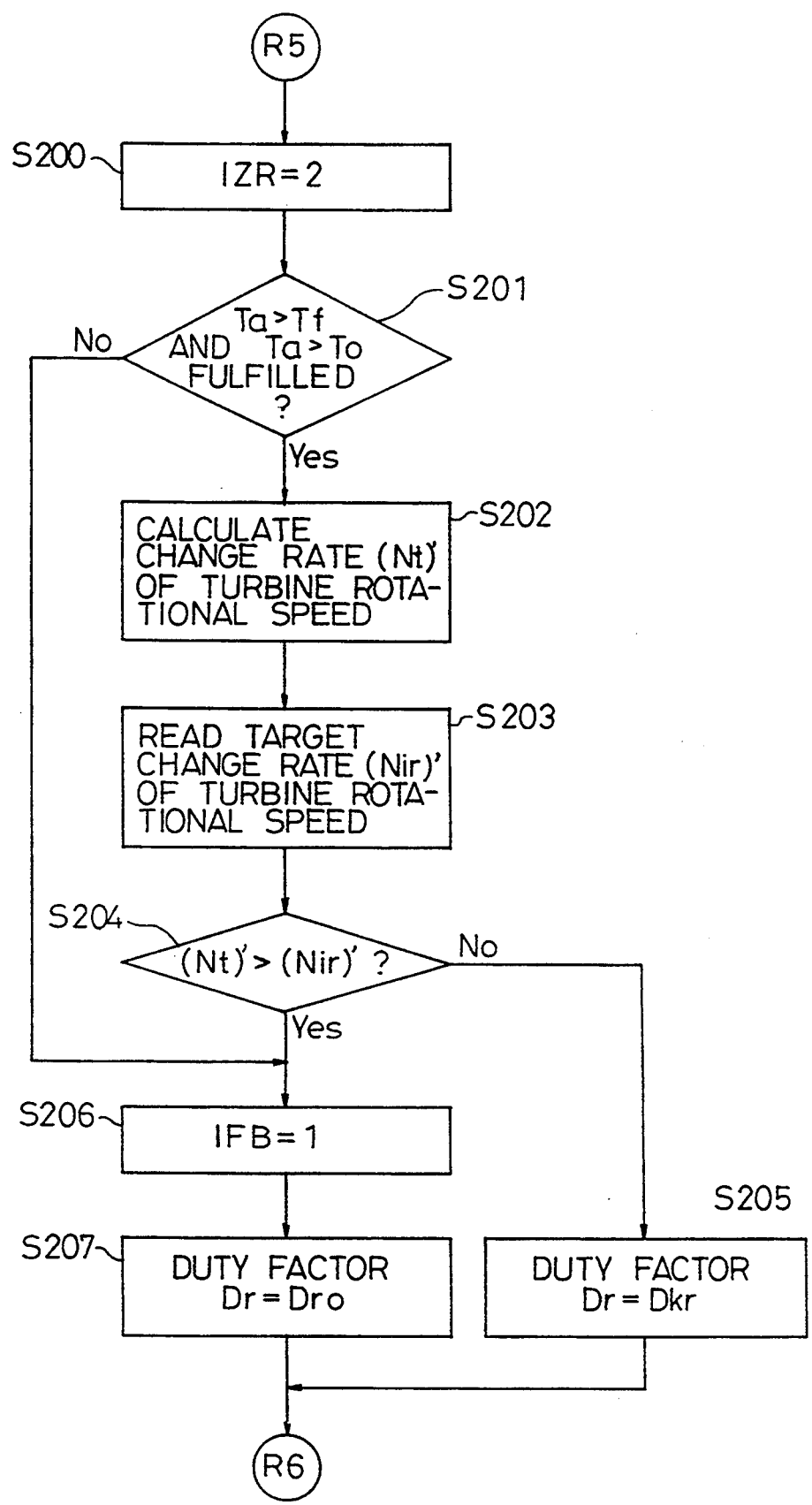
FIG. 20 is a flow chart showing another part of the second-speed clutch control routine subsequent to FIG. 16.
Figure 21:
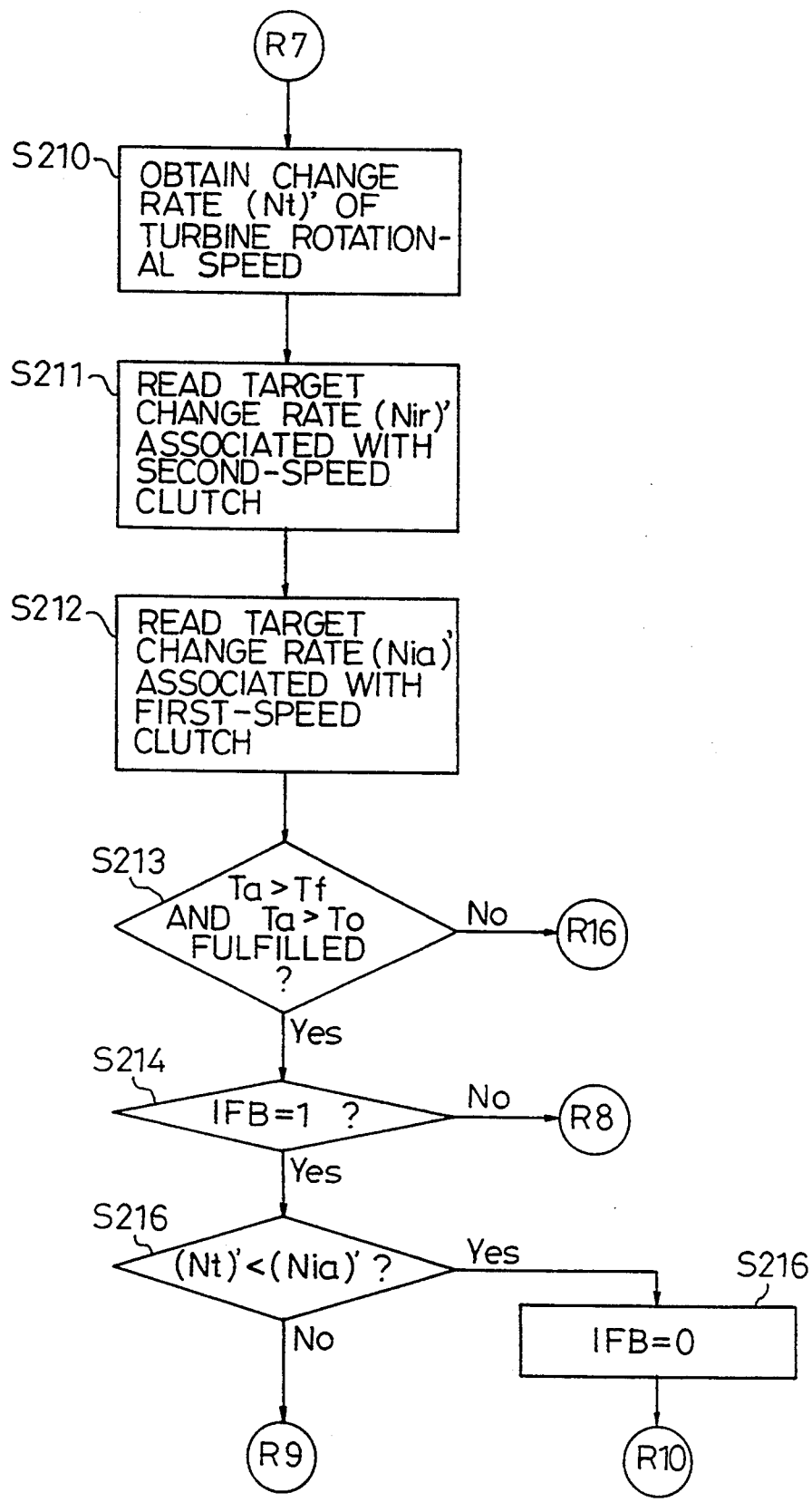
FIG. 21 is a flow chart showing still another part of the second-speed clutch control routine subsequent to FIG. 16.

When the controller 40 detects a deviation (asynchronous state) of the turbine rotational speed Nt from the second-speed synchronous rotation speed Nti at time c in FIG. 13, the condition of Step S174 in FIG. 16 is fulfilled, and Step S200 in FIG. 20 is executed.

In Step S200, the controller 40 sets the flag IZR to "2" which indicates the start of speed change, and executes Step S201. In Step S201, the lengths of the elapsed time Ta, dead space elimination time Tf and hydraulic pressure release time T0' are checked, to thereby determine whether both the disengagement of the second-speed clutch 34 and the dead space elimination of the first-speed clutch 33 have been completed.

If the result of this determination is No, then it means that the aforesaid deviation or asynchronous state is detected in the progress of the release of hydraulic pressure from the second-speed clutch 34 (at time c' in FIG. 13). Such a situation occurs when the release of hydraulic pressure from the second-speed clutch 34 is actually completed before the stored hydraulic pressure release time T0' passes, thus increasing the turbine rotational speed Nt. In this case, the program proceeds to Step S206, without executing Steps S202 to S204, and the controller 40 immediately starts feedback control of the second-speed solenoid valve 11' (feedback control of the transmission torque), described later.

If the result of the determination in Step S201 is Yes and thus the disengagement of the clutch 34 and the dead space elimination of the clutch 33 are both completed before the detection of the rotational deviation or asynchronous state, the controller 40 executes Step S202 to obtain a change rate (Nt)' of the turbine rotational speed Then, in Step S203, the controller 40 reads a target change rate (Nir)' of turbine rotational speed for controlling the hydraulic pressure of the second-speed clutch 34. The target change rate (Nir)' is predetermined according to individual downshift modes, is greater than or equal to the target change rate (Nia)' for controlling the hydraulic pressure of the first-speed clutch 33, and is prestored in the memory of the controller 40.

Conversely, in a case where the target change rate (Nia)' associated with the first-speed clutch 33 is set to be greater than or equal to the target change rate (Nir)' associated with the second-speed clutch 34, if the engine is driven in a power-off state, the turbine rotational speed is controlled to rise based upon a large target change rate (Nia)' and the first-speed clutch 33 is controlled for engagement. At the same time, the turbine rotational speed is controlled to be lowered based upon a small target change rate (Nit)' and also the second-speed clutch 34 is controlled for engagement. Thus, both clutches may be engaged, possibly causing interlocking. The present invention prevents such interlocking by setting the target change rates so as to fulfill the relationship (Nit)' ≧ (Nia)'.

Subsequently, the controller 40 executes Step S204 and compares the calculated change rate (Nt)' of turbine rotational speed with the read target change rate (Nit)'.

If the change rate (Nt)' of turbine rotational speed is smaller than or equal to the target change rate (Nir)' (the result of the determination in Step S204 is No), the controller 40 executes Step S205, thus maintaining the duty factor Dr at the hold duty factor Dkr, and executes Steps S192 to S194 in FIG. 19, thereby driving the second-speed solenoid valve 11' at this duty factor Dr (=Dkr) (at time c in FIG. 13).

If the change rate (Nt)' of turbine rotational speed is already greater than the target change rate (Nit)' at the time of detection of the rotational deviation (asynchronous state) (at time c in FIG. 13), as different from the case illustrated in FIG. 13, and the result of the determination in Step S204 becomes Yes, the controller 40 executes Step S206 and sets a flag IFB to "1" which indicates the start of the feedback control. Then, in Step S207, the initial duty factor Dr0 is set as the duty factor Dr. After determining in Step S192 of FIG. 19 whether the current duty factor Dr takes a value smaller than or equal to the hold duty factor Dr0, the controller 40 drives the second-speed solenoid valve 11' at the duty factor Dr and starts the feedback control.

When the controller 40 executes this routine next, the flag IZR has already been set to "2" in Step S200. Thus, the result of the determination in Step S173 becomes Yes, and the program proceeds to Step S210 in FIG. 21.

The controller 40 obtains a change rate (Nt)' of turbine rotational speed in Step S210, as in the aforementioned case, and successively reads target change rates (Nit)' and (Nia)' of turbine rotational speed associated with the second-speed and first-speed clutches 34 and 33, respectively, in Steps S211 and S212.

The program then proceeds to Step S213 wherein the controller 40 determines whether the elapsed time Ta is longer than the dead space elimination time Tf and at the same time longer than the hydraulic pressure release time T0'. If the result of this determination is No, then it means that the rotational deviation (asynchronous state) is detected in the middle of the release of hydraulic pressure from the second-speed clutch 34 (at time c' in FIG. 13), as in the case where the result of the determination in Step S201 is No. In this case, the program proceeds to Step S224 in FIG. 22 and the controller 40 immediately starts the feedback control of the second-speed solenoid valve 11'.

On the other hand, if it is determined in Step S213 that the elapsed time Ta is longer than the dead space elimination time Tf and at the same time longer than the hydraulic pressure release time T0', the controller 40 executes Step S214 to determine whether the flag IFB is set to "1". In the illustrated case of FIG. 13, the deviation (asynchronous state) has just been detected and Step S206 is not executed; therefore, the flag IFB remains reset and the program proceeds to Step S220 in FIG. 22.

In Step S220, the controller 40 again compares the change rate (Nt)' of turbine rotational speed with the target change rate (Nir)'. The controller 40 continuously actuates the second-speed solenoid valve 11' at the duty factor Dkr until the rate (Nt)' exceeds the rate (Nit)', and after the rate (Nt)' becomes greater than the rate (Nir)', starts the feedback control.

FIG. 13 illustrates the case where the change rate (Nt)' of turbine rotational speed detected immediately after the detection of deviation (asynchronous state) is smaller than the target change rate (Nir)'. In this case, the program proceeds from Step S220 to Step S221, and the hold duty factor Dkr is continuously set as the duty factor Dr. Then, in Step S192 of FIG. 19, it is determined whether the current duty factor Dr takes a value smaller than or equal to the hold duty factor Dkr, and the second-speed solenoid valve 11' is actuated at the duty factor Dr (=Dkr).

Between time c and time j in FIG. 13, the controller 40 determines that the change rate (Nt)' of turbine rotational speed takes a value smaller than or equal to the target change rate (Nir)', and thus continuously actuates the second-speed solenoid valve 11' at the duty factor Dr (=Dkr).

When the change rate (Nt)' of turbine rotational speed increases and becomes greater than the target change rate (Nir)' (at time j), as shown in FIG. 13, the controller 40 starts the feedback control as mentioned before. Namely, since the result of the determination in Step S220 is Yes, the controller 40 executes Step S222 to set the flag IFB to "1" which indicates the start of the feedback control. Then, in Step S233, the initial duty factor Dr0 is set as the duty factor Dr, and Steps 192 to S194 are executed to start the feedback control in which the second-speed solenoid valve 11' is driven at the duty factor Dr (=Dr0) (j in the figure).

When the controller 40 executes this routine next, the flag IFB has been set to "1" in Step S222, and thus the result of the determination in Step S214 becomes Yes, whereupon the program proceeds to Step S215.

In Step S215, the controller 40 compares the change rate (Nt)' of turbine rotational speed with the target change rate (Nia)' which is used for controlling with the first-speed clutch 33. In the present case, the change rate (Nt)' is greater than the target value (Nia)', and thus the program proceeds from Step S215 to Step S225 in FIG. 22.

In Step S225, the controller 40 determines a duty-factor correction amount ΔDrf based on the difference between the change rate (Nt)' of turbine rotational speed and the target change rate (Nit)' associated with control of the second-speed clutch 34. The method of calculating the correction amount ΔDrf also is not particularly limited, and the correction amount is computed in the same manner as in the case of the feedback correction amount ΔDaf for the first-speed solenoid valve 11.

Subsequently, in Step S226, the controller 40 sets a value obtained by adding the correction amount ΔDrf to the initial duty factor Dr0, as the duty factor Dr, then determines whether the current duty factor Dr takes a value smaller than or equal to the hold duty factor Dr0, in Step S192 of FIG. 19, and energizes the second-speed solenoid valve 11' at the thus-set duty factor Dr.

During the period from the time j to the time k in FIG. 13, a sequence of Steps S160, S165, S170 to S173, S210 to S215, S225, S226, and S192 to S194 is repeatedly executed while the routine is repeated. As a result, the feedback control of the duty factor of the second-speed solenoid valve 11' is continued such that the change rate (Nt)' of turbine rotational speed becomes equal to the target change rate (Nit)'.

While the feedback control is executed, engagement of the first-speed clutch 33 progresses, as previously mentioned. When the change rate (Nt)' becomes smaller than the target value (Nia)' associated with the first-speed clutch 33 at time k in FIG. 13, the condition of Step S215 is fulfilled and the program proceeds to Step S216.

Figure 22:
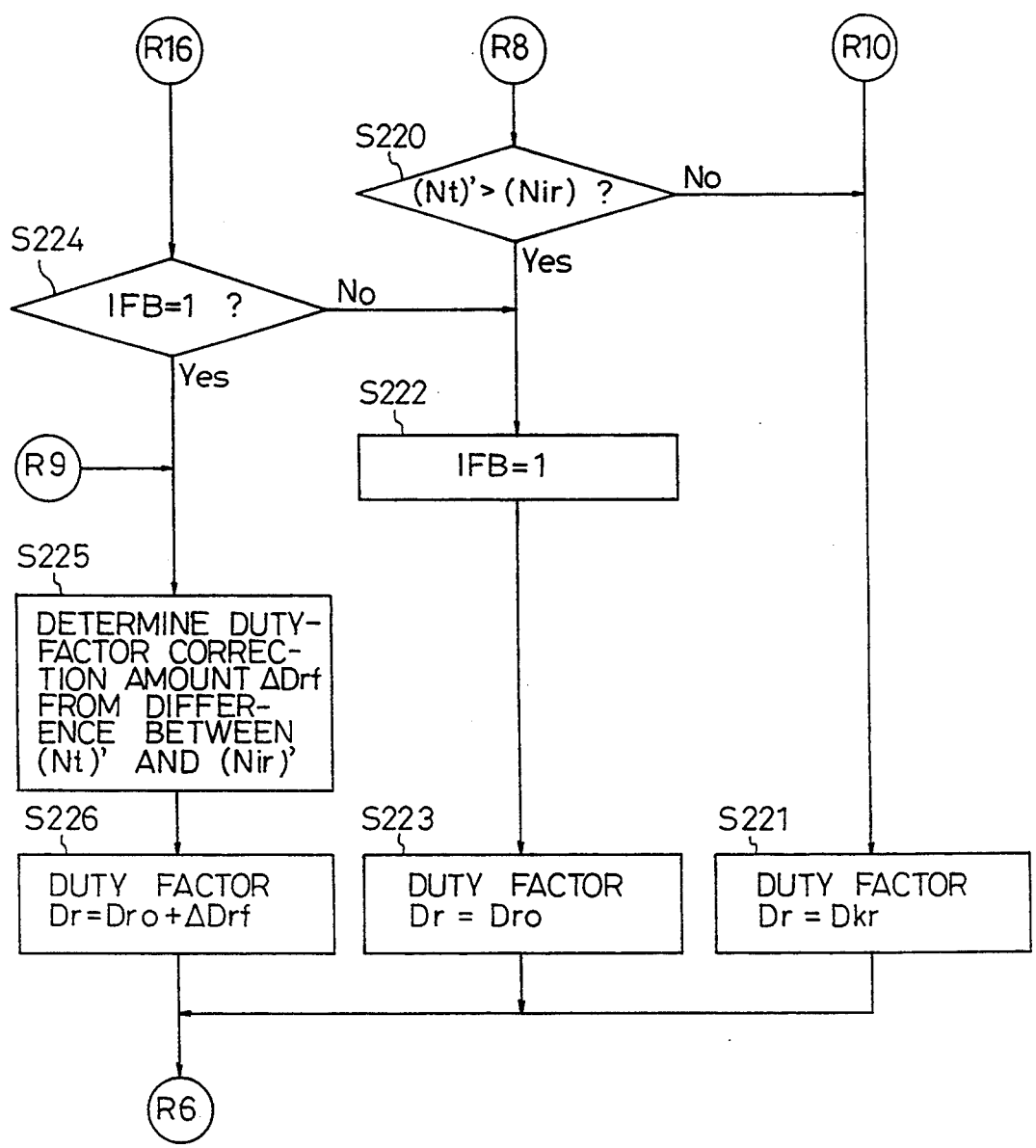
FIG. 22 is a flow chart showing part of the second-speed clutch control routine subsequent to FIG. 21.

In Step S216, the controller 40 resets the flag IFB to "0" which indicates that the feedback control is terminated, and then sets the hold duty factor Dkr as the duty factor Dr, in Step S221 of FIG. 22. After making the determination of Step S192 in FIG. 19, the controller 40 actuates the second-speed solenoid valve 11' at the duty factor Dr (=Dkr) (time k in FIG. 13). Namely, the second-speed clutch 34 is held again at the position immediately before engaged state.

Thereafter, the controller 40 repeatedly executes the routine, thereby continuously actuating the second-speed solenoid valve 11' at the hold duty factor Dkr (between time k and time d in FIG. 13).

Figure 23:
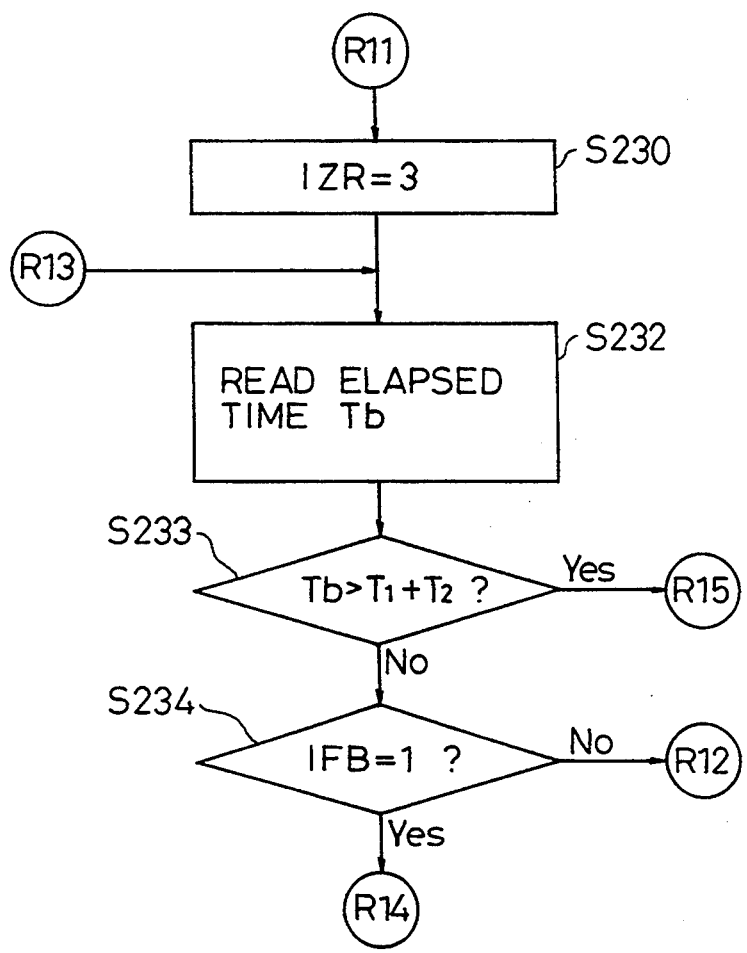
FIG. 23 is a flow chart showing another part of the second-speed clutch control routine subsequent to FIG. 16.

In this case, also the engagement of the first-speed clutch 33 progresses, as mentioned before. As a result, the turbine rotational speed Nt increases as shown in FIG. 13. Then, at time d in FIG. 13, synchronization of the turbine rotational speed Nt with the first-speed rotation speed is detected (Step S172), and Step S230 in FIG. 23 is executed, whereby the program proceeds from the third procedure to the fourth procedure. At this time, the controller 40 starts measuring the time Tb elapsed from the entry into the fourth procedure.

The time Tb thus measured is identical with the elapsed time Tb used in the first-speed solenoid valve control routine, and accordingly, when the fourth procedure of the first-speed solenoid valve control routine is already started, the time Tb measured from the start of the fourth procedure in the first-speed control routine is used as the elapsed time Tb for the second-speed control routine.

In Step S230, the controller 40 sets the flag IZR to "3", and then in Step S232, reads the elapsed time Tb. The program proceeds to Step S233, wherein the controller 40 compares the elapsed time Tb with the sum total of the aforementioned times T1 and T2.

In the present case, synchronization with the first-speed synchronous rotation speed has just been detected in Step S172, and therefore, the elapsed time Tb is shorter than the time (T1+T2). Thus, the controller 40 executes Step S234 to determine whether the flag IFB is set to "1".

Figure 24:
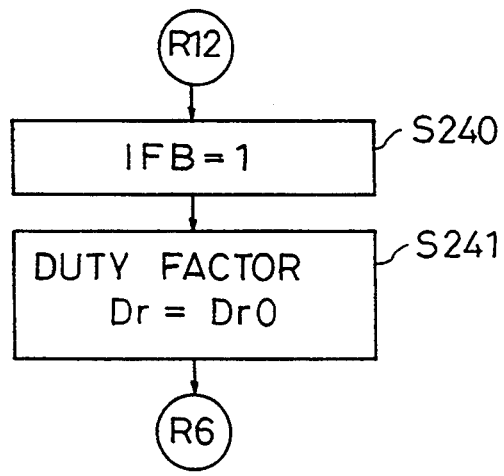
FIG. 24 is a flow chart showing still another part of the second-speed clutch control routine subsequent to FIG. 23.

When the flag IFB is reset at the time of detection of the synchronization with the first-speed synchronous rotation speed, the program proceeds from Step S234 to Step S240 in FIG. 24. In Step S240, the controller 40 sets the flag IFB to "1" which indicates that the feedback control has been started, and then in Step S241, sets the initial duty factor Dr0 as the duty factor Dr. Subsequently, the controller 40 executes Steps S192 to S194 in FIG. 19 and energizes the second-speed solenoid valve 11' at the duty factor Dr (time d in FIG. 13).

When the controller 40 executes this routine next, Steps S160, S165, S170 and S171 are executed. Since the flag IZR has been set to "3" in Step S230 of FIG. 23, the program proceeds from Step S171 to Step S232 in FIG. 23.

After reading the elapsed time Tb in Step S232, the controller 40 compares the elapsed time Tb with the time (T1+T2), in Step S233. During the period from time d to time f in FIG. 13, the elapsed time Tb is shorter than the time (T1+T2) and the result of the determination in Step S233 is No, and thus the controller executes Step S234.

Figure 25:
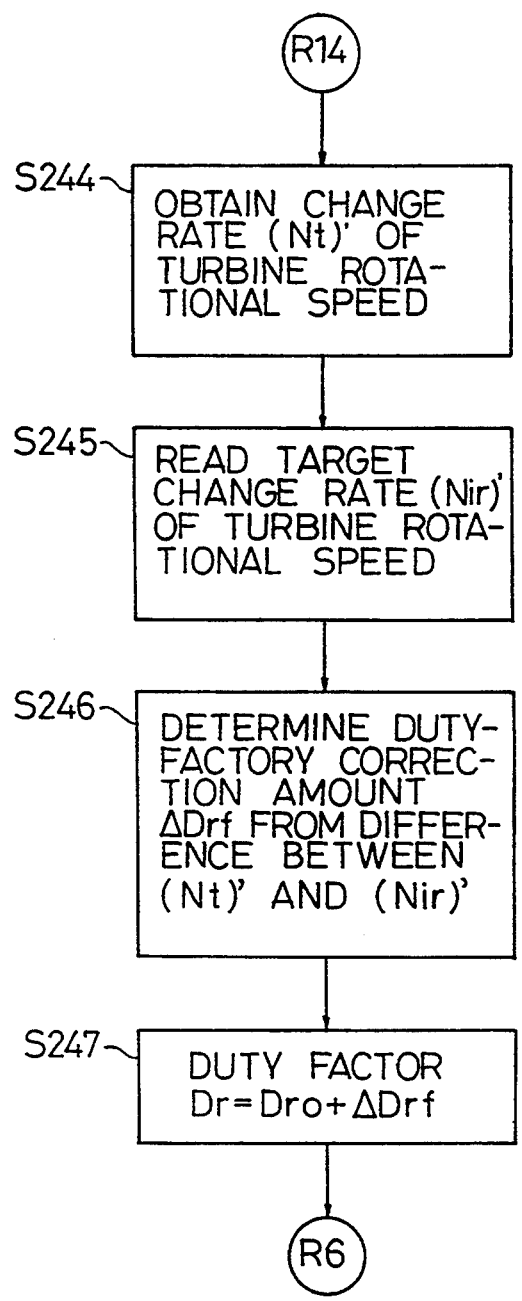
FIG. 25 is a flow chart showing a further part of the second-speed clutch control routine subsequent to FIG. 23.

The result of the determination in Step S234 becomes Yes because the flag IFB has been set to "1" in Step S240, and accordingly, the program proceeds to Step S244 in FIG. 25. In Step S244, the controller 40 calculates a change rate (Nt)' of the turbine rotational speed Nt, and in Step S245, reads a target change rate (Nit)' of turbine rotational speed from the map stored in the memory.

Figure 27:
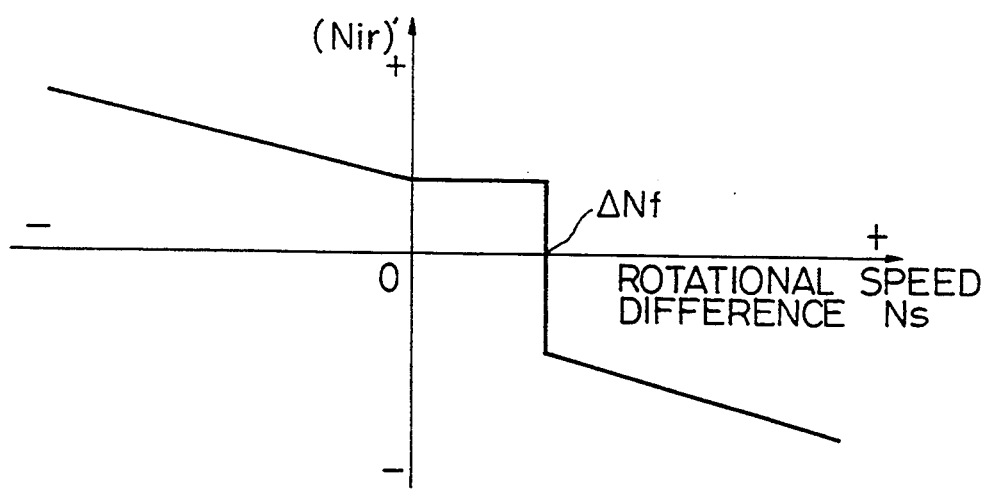
FIG. 27 is a conceptual diagram of a map for determining a target change rate (Nit)' of turbine rotational speed.

FIG. 27 shows the relationship between the target change rate (Nir)' to be read and a difference Ns in the rotational speed. First, the controller 40 obtains a product of the rotational speed No of the transfer drive gear, detected by the No sensor 22, and a second-speed gear ratio K2, then obtains a rotational speed difference Ns (=Nt−K2·No) between the product and the turbine rotational speed Nt, and determines the target change rate (Nir)' of turbine rotational speed based upon the value of the rotational speed difference Ns.

Specifically, when the rotational speed difference Ns takes a negative value, the target change rate (Nir)' is set at a positive value which gradually increases as the rotational speed difference Ns increases in the negative direction; when the rotational speed difference Ns is greater than or equal to "0" and at the same time smaller than or equal to the predetermined value ΔNf, the target change rate is set at a predetermined positive value; and when the rotational speed difference Ns is greater than ΔNf, the target change rate is set at a negative value which gradually decreases with increase in the rotational speed difference Ns.

Referring again to FIG. 25, the controller 40 executes Step S246 and determines a duty-factor correction amount ΔDrf based on the difference between the change rate (Nt)' and the target value (Nit)', by a calculation method similar to that used for obtaining the feedback correction amount ΔDaf of the first-speed solenoid valve 11.

The controller 40 then sets the sum of the feedback initial value Dr0 and the correction amount ΔDrf as the duty factor Dr, in Step S247, and drives the second-speed solenoid valve 11' at the thus-set duty factor Dr, in Steps S192 to S194 in FIG. 19.

Figure 26:
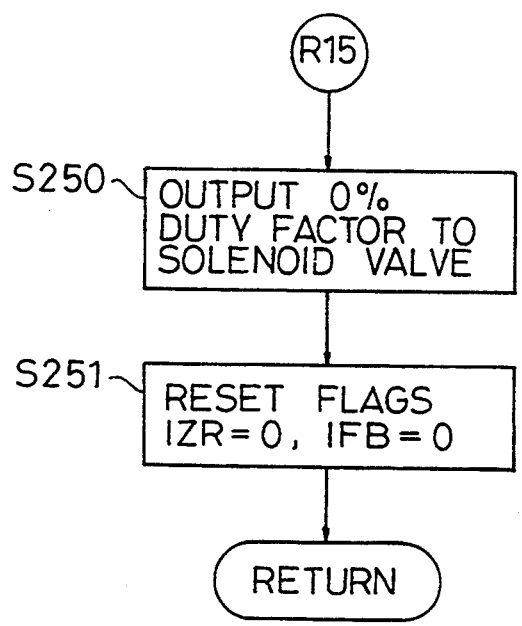
FIG. 26 is a flow chart showing the remaining part of the second-speed clutch control routine subsequent to FIG. 23.

When the elapsed time Tb reaches the time (T1+T2) (at time f in FIG. 13) while the controller 40 continues the feedback control of the second-speed clutch 34, the result of the determination in Step S233 of FIG. 23 becomes Yes, and thus the program proceeds from Step S233 to Step S250 in FIG. 26.

In Step S250, the controller 40 operates the second-speed solenoid valve 11' at a 0% duty factor, whereby the second-speed clutch 34 becomes completely disengaged. At this time, the first-speed clutch 33 is completely engaged, as mentioned before, and therefore, the switching of clutch connection between the clutches 33 and 34 is completed and the downshift of the automatic transmission 2 from the second to the first speed is accomplished.

Then, the controller 40 resets the flags IZR and IFB to "0" in Step S251, and ends the execution of the control routine.

In the feedback control of the foregoing embodiment, the change rate (Nt)' of the turbine rotational speed is used as a quantity representing the speed-change state of the automatic transmission 2. However, the turbine rotational speed Nt, a rate (Nt)'' of change in the change rate (Nt)' of the turbine rotational speed or the like may be used as the speed-change state quantity.

From the above-described embodiment of the present invention, it is apparent that the present invention may be modified as would occur to one of ordinary skill in the art without departing from the spirit and scope of the present invention which should be defined solely by the appended claims. All such modifications as would be obvious to one of ordinary skill in the art should not be regarded as a departure from the spirit and scope of the invention, and should be included within the scope of the invention as defined solely by the appended claims.

What is claimed is:

1. In an automotive automatic transmission including a first frictional engaging element for establishing a first gear stage, a second frictional engaging element for establishing a second gear stage, a first electromagnetic valve for controlling an operating oil pressure supplied to the first frictional engaging element, and a second electromagnetic valve for controlling an operating oil pressure supplied to the second frictional engaging element, a speed change control apparatus for controlling the first and second electromagnetic valves such that the first frictional engaging element, which has been engaged, is released, and the second frictional engaging element, which has been released, is engaged, to carry out a shift from the first gear stage to the second gear stage, said speed change control apparatus comprising:

operating state detecting means for detecting an operating state quantity of the automatic transmission; and feedback controller, said feedback controller including, feedback target value setting means for setting first and second feedback target values;

first feedback control means for feedback-controlling the first electromagnetic valve such that the operation state quantity detected by the operating state detecting means converges to the first feedback target value; and second feedback control means for feedback-controlling the second electromagnetic valve such that the operation state quantity detected by the operating state detecting means converges to the second feedback target value, the first feedback target value being set to be greater than or equal to the second feedback target value, whereby said shift from the first gear stage to the second gear stage is carried out utilizing feedback-control of both the first and second electromagnetic valves.

2. The speed change control apparatus according to claim 1, further including:

means for interrupting the feedback control of the first feedback control means and making the transmission torque through the first frictional engaging element substantially zero when the detected operation state quantity becomes smaller than or equal to the second feedback target value.

3. The speed change control apparatus according to claim 1, wherein said operation state quantity is represented by a rate of change in rotational speed of an input shaft of the automatic transmission.

4. The speed change control apparatus according to claim 1, further including:

asynchronous state detecting means for detecting an asynchronous state, where said first gear stage is disengaged; and synchronous state detecting means for detecting a synchronous state, where said second gear stage is established, the feedback control for said first and second electromagnetic valves being carried out during at least a time period starting at a moment when the asynchronous state is detected and ending at a moment when the synchronous state is detected.

5. A speed change control method for an automotive automatic transmission in which a first frictional engaging element, which has been engaged, is released, and a second frictional engaging element, which has been released, is engaged, to carry out a shift from a first gear stage to a second gear stage, said speed change control method comprising the steps of:

(a) setting a first feedback target value;
(b) setting a second feedback target value smaller than the first feedback target value;
(c) detecting an operating state quantity indicative of an operating state of the automatic transmission; and
(d) feedback-controlling a transmission torque through a first electromagnetic valve connected to the first frictional engaging element such that the detected operation state quantity converges to the first feedback target value;
(e) feedback-controlling a transmission torque through a second electromagnetic valve connected to the second frictional engaging element such that the detected operation state quantity converges to the second feedback target value.

6. The speed change control method according to claim 5, further including the step of, (f) interrupting the feedback control of step (d) associated with the first frictional engaging element; and
(g) rendering the transmission torque through the first frictional engaging element substantially zero, steps (f) and (g) occurring upon the operation state quantity becoming smaller than or equal to the second feedback target value.

7. The speed change control method according to claim 5, wherein said operation state quantity is represented by a rate of change in rotational speed of an input shaft of the automatic transmission.

8. The speed change control method according to claim 5, further including the steps of:

(f) detecting an asynchronous state, where said first gear stage is disengaged; and
(g) detecting a synchronous state, where said second gear stage is established, the feedback control for said first and second electromagnetic valves being carried out during at least a time period starting at a moment when the asynchronous state is detected and ending at a moment when the synchronous state is detected.

9. A method for, by controlling first and second electromagnetic valves to release a previously engaged first frictional engaging element and engage a previously released second frictional engaging element, respectively, carrying out a shift from a first gear stage to a second gear stage in an automatic transmission, the automatic transmission including the first frictional engaging element for establishing a first gear stage, the second frictional engaging element for establishing a second gear stage, the first electromagnetic valve for controlling operating oil pressure supplied to the first frictional engaging element, and the second electromagnetic valve for controlling operating oil pressure supplied to the second frictional engaging element, the method comprising the steps of:

(a) detecting a rotational speed change rate of an input shaft of the automatic transmission;
(b) feedback controlling pressure of the operating oil supplied to the first electromagnetic valve upon the detected rotational speed change rate being greater than a first predetermined target speed change rate; and
(c) feedback controlling pressure of the operating oil supplied to the second electromagnetic valve upon the detected rotational speed change rate being greater than a second predetermined target speed change rate, the first predetermined target speed change rate being greater than the second predetermined target speed change rate, to thereby carry out a shift from a first gear stage to a second gear stage irrespective of an engine driving state.

10. The method of claim 9, further comprising the step of:
(d) inhibiting feedback control of step (b) upon the detected rotational speed change rate being less than or equal to the second predetermined target speed change rate.

11. The method of claim 9, wherein step (b) includes the substeps of,
(1) controlling the pressure of the operating oil supplied to the first electromagnetic valve based upon a first predetermined duty factor, and
(2) incrementally adjusting the first predetermined duty factor to thereby provide feedback control.

12. The method of claim 11, wherein step (b)(2) includes the further substeps of,
determining a first duty factor correction amount from a difference between the detected rotational speed change rate and the first predetermined target speed change rate, and
adding the determined first duty factor correction amount to the first predetermined duty factor to thereby provide the incremental adjustment.

13. The method of claim 9, wherein step (c) includes the substeps of,
(1) controlling the pressure of the operating oil supplied to the second electromagnetic valve based upon a predetermined duty factor, and
(2) incrementally adjusting the predetermined duty factor to thereby provide feedback control.

14. The method of claim 13, wherein step (c)(2) includes the further substeps of,
determining a duty factor correction amount from a difference between the detected rotational speed change rate and the second predetermined target speed change rate, and
adding the determined duty factor correction amount to the predetermined duty factor to thereby provide incremental adjustment.

15. The method of claim 12, wherein step (c) includes the substeps of,
(1) controlling the pressure of the operating oil supplied to the second electromagnetic valve based upon a second predetermined duty factor, and
(2) incrementally adjusting the second predetermined duty factor to thereby provide feedback control.

16. The method of claim 15, wherein step (c)(2) includes the further substeps of,
determining a second duty factor correction amount from a difference between the detected rotational speed change rate and the second predetermined target speed change rate, and
adding the determined second duty factor correction amount to the second predetermined duty factor to thereby provide incremental adjustment.

17. The method of claim 16, further comprising the step of:
(d) inhibiting feedback control of step (b) upon the detected rotational speed change rate being less than or equal to the second predetermined target speed change rate.

18. The speed change control method according to claim 9, further including the steps of:
(d) detecting an asynchronous state, where said first gear stage is disengaged; and
(e) detecting a synchronous stage, when said second gear stage is established, the feedback control for said first and second electromagnetic valves being carried out during at least a time period starting at a moment when the asynchronous state is detected and ending at a moment when the synchronous state is detected.

19. An apparatus for, by controlling first and second electromagnetic valves to release a previously engaged first frictional engaging element and engage a previously released second frictional engaging element, respectively, carrying out a shift from a first gear stage to a second gear stage in an automatic transmission, the automatic transmission including the first frictional engaging element for establishing a first gear stage, the second frictional engaging element for establishing a second gear stage, the first electromagnetic valve for controlling operating oil pressure supplied to the first frictional engaging element, and the second electromagnetic valve for controlling operating oil pressure supplied to the second frictional engaging element, the apparatus comprising:
detection means for detecting a rotational speed change rate of an input shaft of the automatic transmission;
first feedback control means for feedback controlling pressure of the operating oil supplied to the first electromagnetic valve upon the detected rotational speed change rate being greater than a first predetermined target speed change rate; and
second feedback control means for feedback controlling pressure of the operating oil supplied to the second electromagnetic valve upon the detected rotational speed change rate being greater than a second predetermined target speed change rate, the first predetermined target speed change rate being greater than the second predetermined target speed change rate, to thereby carry out a shift from a first gear stage to a second gear stage irrespective of an engine driving state.

20. The apparatus of claim 19, further comprising:
inhibiting means for inhibiting feedback control of the first feedback control means upon the detected rotational speed change rate being less than or equal to the second predetermined target speed change rate.

21. The apparatus of claim 19, wherein the first feedback control means includes,
first controlling means for controlling the pressure of the operating oil supplied to the first electromagnetic valve based upon a first predetermined duty factor, and
first incremental adjustment means for incrementally adjusting the first predetermined duty factor to thereby provide feedback control.

22. The apparatus of claim 21, wherein the first incremental adjustment means includes,
first correction amount determining means for determining a first duty factor correction amount from a difference between the detected rotational speed change rate and the first predetermined target speed change rate, and
first adding means for adding the determined first duty factor correction amount to the first predetermined duty factor to thereby provide the incremental adjustment.

23. The apparatus of claim 19, wherein the second feedback control means includes, controlling means for controlling the operating oil supplied to the second electromagnetic valve based upon a predetermined duty factor, and incremental adjustment means for incrementally adjusting the predetermined duty factor to thereby provide feedback control.

24. The apparatus of claim 23, wherein the incremental adjustment means includes, correction amount determining means for determining a duty factor correction amount from a difference between the detected rotational speed change rate and the second predetermined target speed change rate, and adding means for adding the determined duty factor correction amount to the predetermined duty factor to thereby provide incremental adjustment.

25. The apparatus of claim 22, wherein the second feedback control means includes, second control means for controlling the operating oil supplied to the second electromagnetic valve based upon a second predetermined duty factor, and second incremental adjustment means for incrementally adjusting the second predetermined duty factor to thereby provide feedback control.

26. The apparatus of claim 25, wherein the second incremental adjustment means includes, second determining means for determining a second duty factor correction amount from a difference between the detected rotational speed change rate and the second predetermined target speed change rate, and second adding means for adding the determined second duty factor correction amount to the second predetermined duty factor to thereby provide incremental adjustment.

27. The apparatus of claim 26, further comprising:

inhibiting means for inhibiting feedback control of the first feedback control means upon the detected rotational speed change rate being less than or equal to the second predetermined target speed change rate.

28. The speed change control apparatus according to claim 19, further including:

asynchronous state detecting means for detecting an asynchronous state, where said first gear stage is disengaged; and synchronous state detecting means for detecting a synchronous state, where said second gear stage is established, the feedback control for said first and second electromagnetic valves being carried out during at least a time period starting at a moment when the asynchronous state is detected and ending at a moment when the synchronous state is detected.

* * * * *